(12) United States Patent
Mir et al.

(10) Patent No.: US 9,436,361 B2
(45) Date of Patent: *Sep. 6, 2016

(54) METHODS AND SYSTEMS FOR GENERATING A COMBINED DISPLAY OF TASKBAR BUTTON GROUP ENTRIES GENERATED ON A LOCAL MACHINE AND ON A REMOTE MACHINE

(71) Applicant: Citrix Systems, Inc., Fort Lauderdale, FL (US)

(72) Inventors: Abraham Mir, Pembroke Pines, FL (US); Georgy Momchilov, Coconut Creek, FL (US); Prasanna Padmanabhan, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 154 days.

This patent is subject to a terminal disclaimer.

(21) Appl. No.: 14/283,809

(22) Filed: May 21, 2014

(65) Prior Publication Data

US 2014/0258914 A1 Sep. 11, 2014

Related U.S. Application Data

(63) Continuation of application No. 12/897,863, filed on Oct. 5, 2010, now Pat. No. 8,769,428.

(60) Provisional application No. 61/285,022, filed on Dec. 9, 2009.

(51) Int. Cl.
*G06F 3/0484* (2013.01)
*G06F 9/44* (2006.01)
*G06F 3/0481* (2013.01)
*G06F 3/14* (2006.01)
*G09G 5/14* (2006.01)

(52) U.S. Cl.
CPC ............ *G06F 3/0484* (2013.01); *G06F 9/4445* (2013.01); *G06F 3/0481* (2013.01); *G06F 3/14* (2013.01); *G09G 5/14* (2013.01)

(58) Field of Classification Search
CPC ..... G06F 3/048; G06F 3/0484; G06F 9/4445
USPC ........................................................ 715/779
See application file for complete search history.

(56) References Cited

U.S. PATENT DOCUMENTS 7,657,837 B2 2/2010 Shappir et al.
2001/0035882 A1 11/2001 Stoakley et al.
(Continued)

OTHER PUBLICATIONS

Chinese Office Action on 201080063399.8 dated Apr. 23, 2014.
(Continued)

*Primary Examiner* — Angie Badawi
(74) *Attorney, Agent, or Firm* — Foley & Lardner LLP; John D. Lanza

(57) ABSTRACT

The present disclosure features methods and systems for updating a taskbar, generated and displayed by a local computer, with a user interface element representative of a remote application executing on a remote computer and application output generated by the remote application. These methods and system include a local client receiving application output generated by a remote application and remote window configuration information, generating an application output window comprising local taskbar grouping configuration information, and updating a taskbar responsive to the local taskbar grouping configuration information.

18 Claims, 19 Drawing Sheets

(56) References Cited

U.S. PATENT DOCUMENTS

| | | | |
|---|---|---|---|
| 2003/0063119 A1 | 4/2003 | Bloomfield et al. | |
| 2005/0088410 A1 | 4/2005 | Chaudhri | |
| 2006/0224989 A1 | 10/2006 | Pettiross et al. | |
| 2009/0070404 A1* | 3/2009 | Mazzaferri | G06F 9/542 709/202 |
| 2010/0271479 A1 | 10/2010 | Heydlauf | |
| 2010/0313165 A1 | 12/2010 | Louch et al. | |

OTHER PUBLICATIONS

Office Action on U.S. Appl. No. 12/897,871 dated Jun. 18, 2014.
U.S. Appl. No. 12/897,863, filed Oct. 5, 2010.
U.S. Appl. No. 12/897,871, filed Oct. 5, 2010.
Chinese Office Action on 201080063383.7 dated Nov. 24, 2014.
Chinese Office Action on 201080063383.7 dated Jul. 11, 2014.
Citrix Systems: "Plug-in for Macintosh Administrator's Guide Citrix Online Plug-in for Macintosh, Version 11.x", Aug. 5, 2009, pp. 1-35, XP055147774, Retrieved from the Internet: URL:http://support.citrix.com/servlet/KbServlet/download/21054-102-511118/Citrix-Online-Plugin-for-Macintosh-AdministratorsGuide.pdf [retrieved on Oct. 20, 2014].
Extended European Search Report mailed Nov. 3, 2014 in EP Application No. 10836445.6.
Notice of Allowance on U.S. Appl. No. 12/897,871 Dtd Nov. 3, 2015.
Office Action in U.S. Appl. No. 12/897,871 dated Aug. 11, 2015.
Office Action in U.S. Appl. No. 12/897,871 Dtd Jan. 15, 2015.
Office Action in U.S. Appl. No. 12/897,871 Dtd Sep. 22, 2014.

* cited by examiner

METHODS AND SYSTEMS FOR GENERATING A COMBINED DISPLAY OF TASKBAR BUTTON GROUP ENTRIES GENERATED ON A LOCAL MACHINE AND ON A REMOTE MACHINE

RELATED APPLICATIONS

This present application is continuation of U.S. patent application Ser. No. 12/897,863, titled "Methods and Systems for Generating a Combined Display of Taskbar Button Group Entries Generated on a Local Machine and on a Remote Machine" filed on Oct. 5, 2010, which claims priority to and the benefit of co-pending U.S. Provisional Patent Application No. 61/285,022, titled "Methods and Systems for Generating a Combined Display of Taskbar Button Group Entries Generated on a Local Machine and on a Remote Machine," filed Dec. 9, 2009, which are both incorporated herein by reference in their entirety.

FIELD OF THE INVENTION

The present disclosure relates to methods and systems for generating a combined display of taskbar button group entries generated on a local machine and on a remote machine. In particular, the present disclosure relates to methods and systems for displaying, in a taskbar button group generated and displayed by a local machine, an identification of graphical data generated and displayed on the local machine and an identification of graphical data generated on a remote machine and displayed on the local machine.

BACKGROUND OF THE INVENTION

In some environments for integrating a display of remotely generated desktop environments with locally generated desktop environments, data generated by remote application instances and displayed in the local desktop environment are grouped together on the taskbar, regardless of the name or type of remote application instance. Furthermore, in some operating systems, if there are sufficient number of applications launched to trigger stacking of taskbar icons, remote applications will all be grouped together under one taskbar button, such as, by way of example, a taskbar button for a local agent that directs the display of the remotely generated data instead of by the name or type of the remote application. In some environments, this presents an inconvenient and potentially counter-intuitive end user experience, especially if there are a variety of remote applications running (e.g. word processing applications, calculator applications, Internet browsing applications, etc.), because the applications' taskbar buttons do not group by application, nor do they group with local versions of those applications.

BRIEF SUMMARY OF THE INVENTION

In one embodiment, the methods and systems described herein provide comprehensive taskbar grouping integration between remote ("published") applications and their local counterparts. In another embodiment, this functionality provides a seamless, unified user experience. In still another embodiment, this functionality allows hosted applications' taskbar buttons to be grouped together by application (e.g., all word processing applications together, all calendaring applications together, etc.), in the same way that native local applications' taskbar buttons are grouped.

In one embodiment, the functionality described herein allows the remote applications' behavior, with respect to taskbar grouping, to operate substantially similarly to that of the local applications. In another embodiment, the functionality described herein allows for sorting and grouping graphical representations of application instances (e.g., an application's associated icon shown on the taskbar) by application name, both remote-remote grouping, and local-remote grouping (when the same version of the application is running both as a remote application executing on a remote machine and as a local application executing on a local machine).

In one aspect, the present disclosure features a method for updating a taskbar, generated and displayed by a local computer, with a user interface element representative of a remote application executing on a remote computer and application output generated by the remote application. The method includes receiving, by a local client executing on a local machine, application output generated by a remote application executing on a remote computer, and remote window configuration information. The method also includes generating, by the local client responsive to receiving the remote window configuration information, an application output window for displaying the received application output, the application output window comprising local taskbar grouping configuration information generated based on the remote window configuration information. The method further includes updating a taskbar, by an operating system of the local machine, responsive to the local taskbar grouping configuration information.

In some embodiments, the method includes determining, by the local client responsive to a presence of an explicit taskbar grouping flag in the remote window configuration information, a process identifier, window identifier, or application identifier, identifying the remote application in the remote window configuration information. The method also includes generating an application output window with local taskbar grouping configuration information comprising the determined process identifier, window identifier, or application identifier.

In one embodiment, the method includes determining, by the local client responsive to an absence of an explicit taskbar grouping flag in the remote window configuration information, a file system path of the remote application. The method also includes replacing, by the local client, a portion of the file system path of the remote application with an identifier of a local file system path to create a hybrid file system path. The method further includes generating, by the local client, an application output window with local taskbar grouping configuration information comprising the hybrid file system path. In a further embodiment, the method includes identifying a presence of an existing taskbar button group corresponding to the hybrid file system path, and moving a taskbar button corresponding to the generated application output window to the existing taskbar button group, the taskbar button generated by the operating system responsive to generation of the application output window. In another further embodiment, the method includes identifying an absence of an existing taskbar button group corresponding to the hybrid file system path, generating a taskbar button group corresponding to the hybrid file system path, and moving a taskbar button corresponding to the generated application output window to the generated taskbar button group, the taskbar button generated by the operating system responsive to generation of the application output window.

In another embodiment, the method includes receiving, by the local client from the remote computer, a user interface element representative of the remote application and the application output. The method also includes storing, by the local client, the received user interface element with an identification corresponding to the generated application output window. The method further includes displaying, by the operating system responsive to user interaction with a taskbar button generated by the operating system responsive to generation of the application output window, the received user interface element. In a further embodiment, the received user interface element comprises a thumbnail image of the application output, while in another further embodiment, the received user interface element comprises a window title generated by the remote application. In yet another further embodiment, the received user interface element comprises an icon of the remote application.

In another embodiment, the method includes displaying, by the operating system responsive to user interaction with a taskbar button generated by the operating system responsive to generation of the application output window, a thumbnail image of the application output, the thumbnail image generated by the operating system. In yet another embodiment, the method includes displaying, by the operating system responsive to user interaction with a taskbar button generated by the operating system responsive to generation of the application output window, a window title or icon and window title of the generated application output window, the window title generated by the local client.

In another aspect, the present disclosure features a system for updating a taskbar, generated and displayed by a local computer, with a user interface element representative of a remote application executing on a remote computer and application output generated by the remote application. The system includes a local machine executing a local client and an operating system. The local client is configured to receive application output generated by a remote application executing on a remote computer, and remote window configuration information, and generate, responsive to receiving the remote window configuration information, an application output window for displaying the received application output, the application output window comprising local taskbar grouping configuration information generated based on the remote window configuration information. The operating system is configured to update a taskbar responsive to the local taskbar grouping configuration information.

In some embodiments, the local client is further configured to determine, responsive to a presence of an explicit taskbar grouping flag in the remote window configuration information, a process identifier, window identifier, or application identifier identifying the remote application in the remote window configuration information, and generate an application output window with local taskbar grouping configuration information comprising the identified process identifier, window identifier, or application identifier. In other embodiments, the local client is further configured to determine, responsive to an absence of an explicit taskbar grouping flag in the remote window configuration information, a file system path of the remote application. The local client is also configured to replace a portion of the file system path of the remote application with an identifier of a local file system path to create a hybrid file system path, and generate an application output window with local taskbar grouping configuration information comprising the hybrid file system path. In a further embodiment, the local client is also configured to identify a presence of an existing taskbar button group corresponding to the hybrid file system path, and move a taskbar button corresponding to the generated application output window to the existing taskbar button group, the taskbar button generated by the operating system responsive to generation of the application output window. In another further embodiment, the local client is also configured to identify an absence of an existing taskbar button group corresponding to the hybrid file system path, generate a taskbar button group corresponding to the hybrid file system path, and move a taskbar button corresponding to the generated application output window to the generated taskbar button group, the taskbar button generated by the operating system responsive to generation of the application output window.

In one embodiment, the local client is further configured to receive, from the remote computer, a user interface element representative of the remote application and the application output, and store the received user interface element with an identification corresponding to the generated application output window. The operating system is further configured to display, responsive to user interaction with a taskbar button generated by the operating system responsive to generation of the application output window, the received user interface element. In some embodiments, the received user interface element comprises a thumbnail image of the application output, while in other embodiments, the received user interface element comprises a window title generated by the remote application. In still other embodiments, the received user interface element comprises an icon of the remote application.

In some embodiments, the operating system is further configured to generate a taskbar button responsive to generation of the application output window, generate a thumbnail image of the application output window, and display, responsive to user interaction with the taskbar button, the thumbnail image. In other embodiments, the local client is further configured to generate a window title of the application output window, and the operating system is further configured to generate a taskbar button responsive to generation of the application output window, and display, responsive to user interaction with the taskbar button, the window title or icon and window title.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
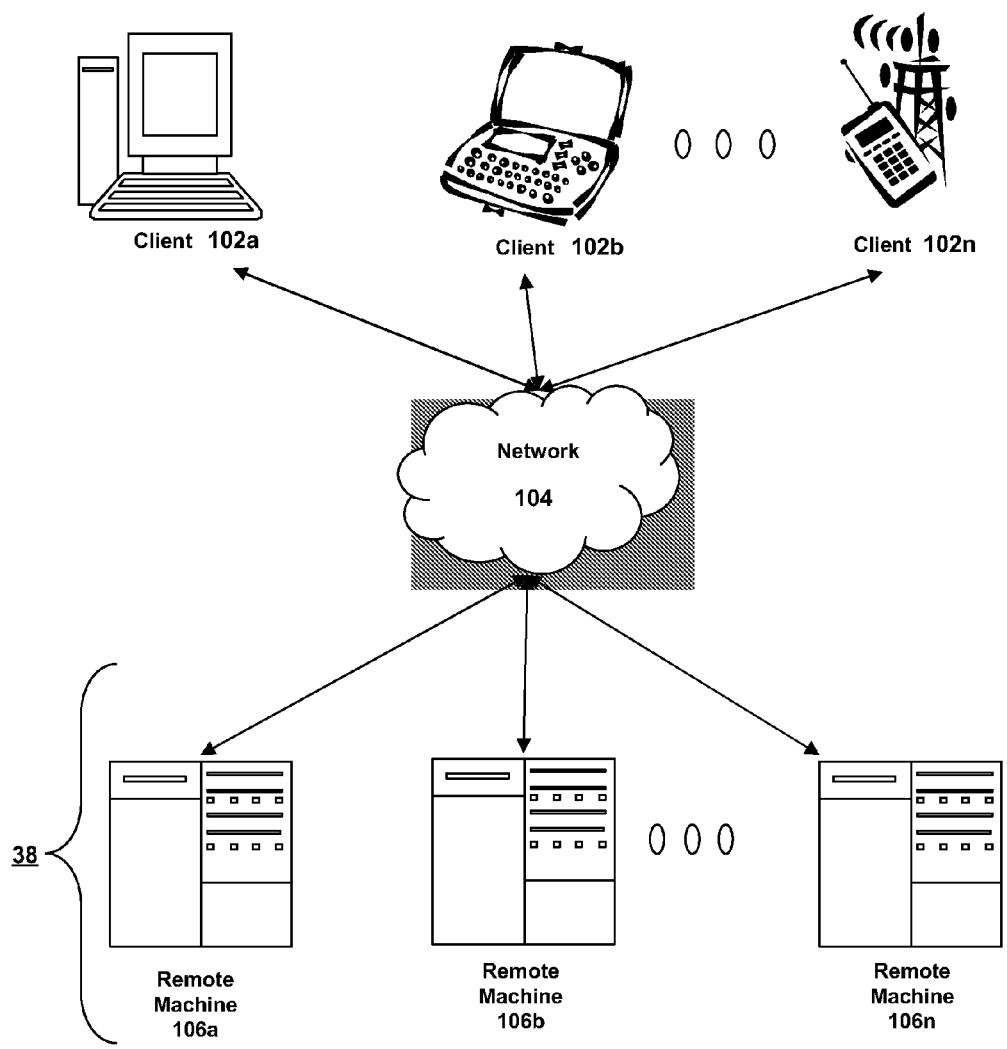
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for displaying, in a taskbar button group generated and displayed by a local machine, an identification of graphical data generated and displayed on the local machine and an identification of graphical data generated on a remote machine and displayed on the local machine;

Section C describes embodiments of systems and methods for updating a dock with a user interface element representative of a remote application executing on a remote machine; and Section D describes embodiments of systems and methods for providing seamless three-dimensional thumbnails.

A. Network and Computing Environment

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm 38. In another of these embodiments, the remote machines 106 may be geographically dispersed. In other embodiments, a server farm 38 may be administered as a single entity. In still other embodiments, the server farm 38 comprises a plurality of server farms 38. The remote machines 106 within each server farm 38 can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines 106 of each server farm 38 do not need to be physically proximate to another remote machine 106 in the same server farm 38. Thus, the group of remote machines 106 logically grouped as a server farm 38 may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm 38 can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106*a*-106*n* in the server farm 38 and receive output of the results of the application execution for display. In some embodiments, only a master node provides the functionality required to identify and provide address information associated with a remote machine 106*b* hosting a requested application.

In one embodiment, the remote machine 106 provides the functionality of a web server. In another embodiment, the remote machine 106*a* receives requests from the local machine 102, forwards the requests to a second remote machine 106*b* and responds to the request by the local machine 102 with a response to the request from the remote machine 106*b*. In still another embodiment, the remote machine 106*a* acquires an enumeration of applications available to the local machine 102 and address information associated with a remote machine 106*b* hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1B:
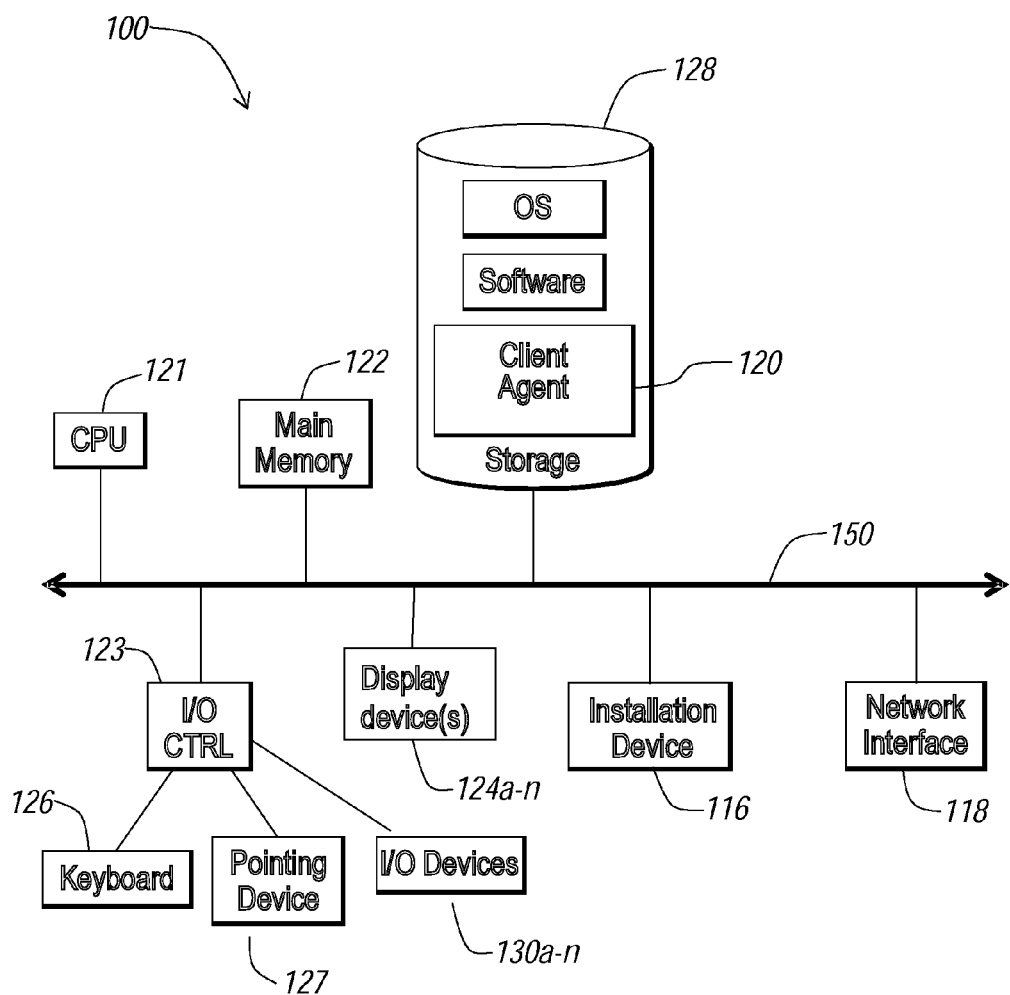
FIGS. 1B-1E are block diagrams depicting embodiments of computers useful in connection with the methods and systems described herein.
Figure 1C:
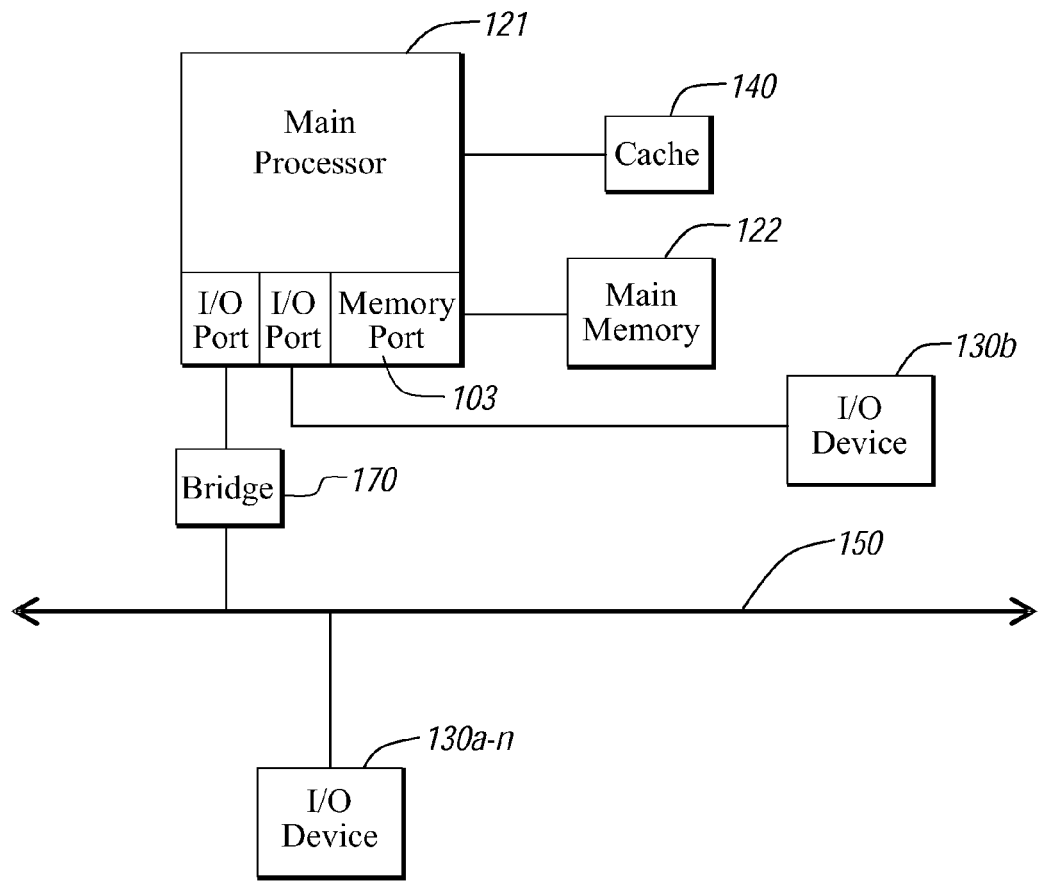

The local machine 102 and remote machine 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
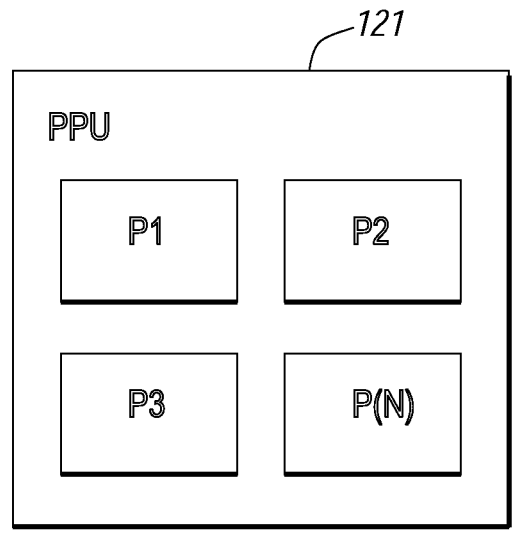

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
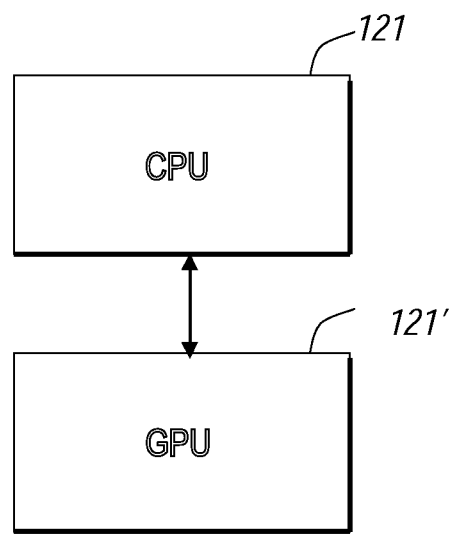

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106*b* and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102*b*.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106*b*) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment—including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

B. Systems and Methods for Displaying, in a Taskbar Button Group Generated and Displayed by a Local Machine, an Identification of Graphical Data Generated and Displayed on the Local Machine and an Identification of Graphical Data Generated on a Remote Machine and Displayed on the Local Machine Referring now to FIG. 2, a block diagram depicts one embodiment of a system for displaying, in a user interface element generated and displayed by a local machine, an identification of graphical data generated and displayed on the local machine and an identification of graphical data generated on a remote machine and displayed on the local machine. In brief overview, the system 200 includes a first agent 202 executing on a local computing device 102, a second agent 204 executing on a remote computing device 106, a first process 206 executing on the remote computing device 106, and a second process 218 executing on the local computing device 102. The first agent 202 receives, from the second agent 204, an identifier of the first process 206 and an identification of a first window 207 generated by the first process 206. The first agent 202 associates a second window 212 with the identifier of the first process 206, the second window 212 generated by the first agent 202 on the local machine 102. Responsive to the association of the second window 212 with the identifier of the first process 206, a shell 214 executing on the local machine 102 displays, in a taskbar button group 230, i) an identification of the second window 212 and ii) an identification of a third window 216, the third window 216 generated by the second process 218 and displayed on the local machine 102.

In some embodiments, a process executing on a computing device—such as the first process 206 executing on the remote computing device 106 or the second process 218 executing on the local computing device 102—generates output data and window attribute data and communicates with a shell executing on the computing device to display the output data according to the window attribute data. In some embodiments, this first process 206 may also be referred to as a remote application. In other embodiments, the first agent 202 receives graphical data and window attribute data from the second agent 204 and directs the display of the received graphical or window attribute data in a desktop environment including a plurality of data objects. In one of these embodiments, a data object is a window displayed in the desktop environment. In another one of these embodiments, the data object is a data structure storing attribute data and may or may not have an associated visible representation in the desktop environment. In still another of these embodiments, a data object is a data structure storing data associated with a user interface element—visual state, identification of associated functionality, location of graphical data, title bar contents, etc.—and a window is a graphical representation of the user interface element. In still even another of these embodiments, a shell 214 executing on a machine provides a display of user interface elements in a desktop environment. This shell may be referred to variously as a finder, a graphical user interface (GUI), a windows or X-windows interface, or any other similar term. In another of these embodiments, the shell 214 displays graphical data associated with a data object in accordance with attribute data associated with the data object. In yet another of these embodiments, the first agent 202 communicates with the shell 214 to direct the local display of remotely generated data.

Figure 2:
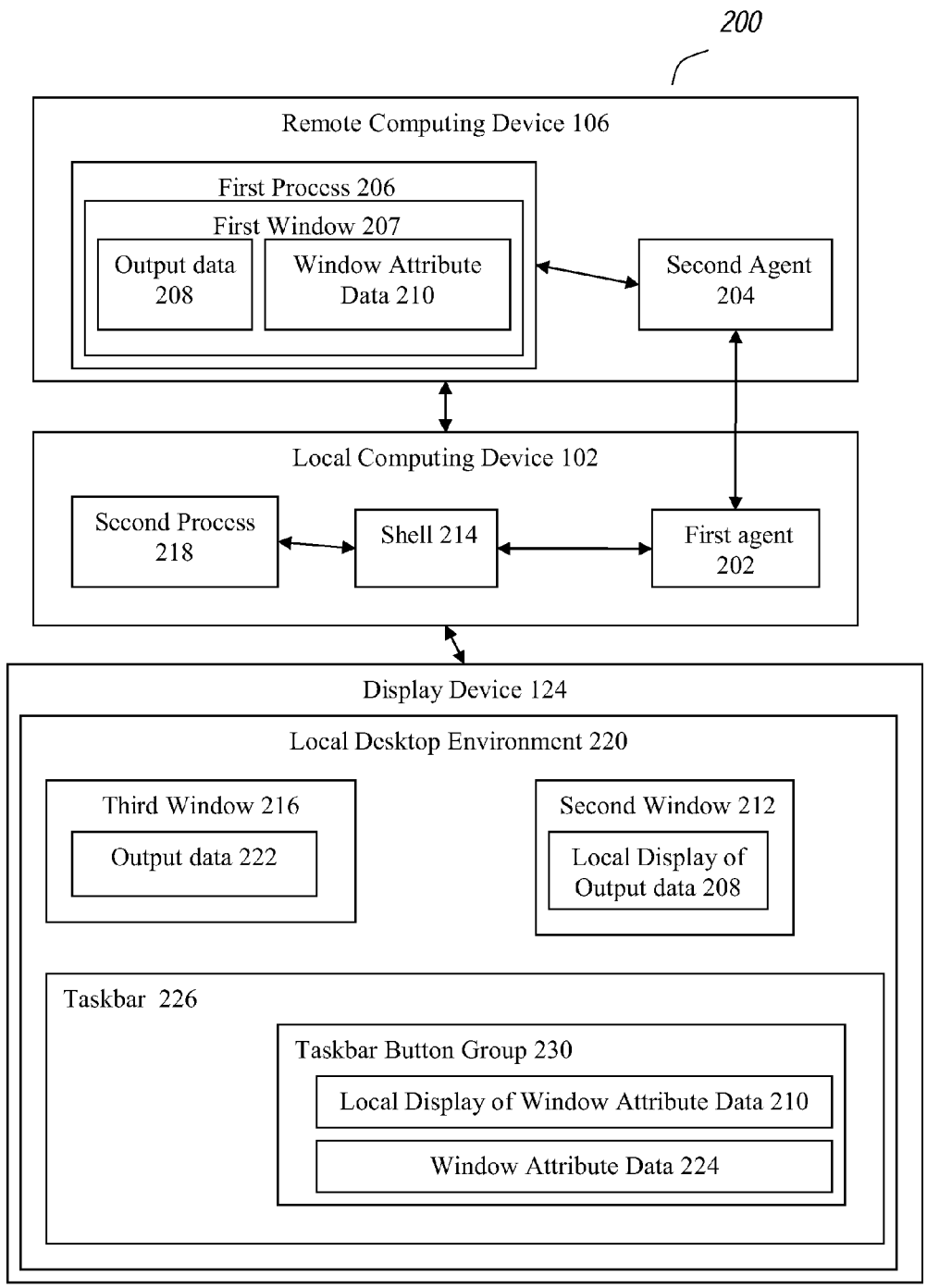
FIG. 2 is a block diagram depicting one embodiment of a system for displaying, in a taskbar button group generated and displayed by a local machine, an identification of graphical data generated and displayed on the local machine and an identification of graphical data generated on a remote machine and displayed on the local machine.

Referring now to FIG. 2, and in greater detail, the first agent 202 executes on the local computing device 102. Although referred to as a first agent, in some embodiments, first agent 202 may be referred to as a local client, local client process, local client agent, or any other similar term. In one embodiment, the local computing device is a computing device as described above in connection with FIG. 1A-1E. In another embodiment, the local computing device is a client device 102, connecting to a server 106 to access one or more resources available to a user of the local computing device 102. In still another embodiment, the first agent 202 is part of a presentation layer protocol agent. In yet another embodiment, the first agent 202 is in communication with a presentation layer protocol agent.

The second agent 204 executes on the remote computing device 106. As with the first agent, in some embodiments, the second agent may be referred to as a remote agent, a remote client, a remote process, a server agent, a server process, or any other similar term. In one embodiment, the remote computing device is a computing device as described above in connection with FIG. 1A-1E. In another embodiment, the second agent 204 is part of a presentation layer protocol agent. In still another embodiment, the second agent 204 is in communication with a presentation layer protocol agent.

In some embodiments, the first agent 202 includes a receiver for receiving, from the second agent 204, data associated with a desktop environment generated on the remote machine 106. In one of these embodiments, for example, the first agent 202 includes a receiver—which may be provided as, by way of example, a dynamically linked library component—that receives window creation and window process data from the second agent 204 for use in displaying a local version of a window generated on the remote machine 106. In some embodiments, the first agent 202 may receive data, such as output data 208 and window attribute data 210 over one or more connections. In one embodiment, one or more connections may be multiplexed into one or more virtual channels. Such multiplexing may allow for different virtual channels to have different bandwidth limits or different priorities, while still being part of a single transport layer connection. This may reduce the transport layer overhead required and provide for SSL or VPN tunnel capability, while still allowing per-channel compression, buffering, and management of communication priority between second agent 204 and first agent 202. In some embodiments, such virtual channels may be dedicated to specific content types or purposes. For example, a first high-priority virtual channel may be dedicated to transmission of output data 208, while a second low-priority virtual channel may be dedicated to transmission of taskbar thumbnail images, discussed in more detail below. In some embodiments, virtual channels may be opened or closed without needing to disestablish or reestablish the transport layer connection over which they communicate.

In one embodiment, the shell 214 is software providing a user interface to the user of a computing device. In one embodiment, a shell may be supplemented or replaced with a third-party shell. In MICROSOFT WINDOWS, the default shell is EXPLORER, which determines the configuration of the desktop (e.g., the task bar, notification area, start menu, etc.). Although referred to as a shell, as discussed above, the shell may also be referred to as a GUI, a finder, an explorer, a windows interface, or any other similar term.

In some embodiments, the first agent 202 includes functionality for communicating with the shell 214 to modify a display of the desktop. In one of these embodiments, the first agent 202 includes a transmitter sending instructions to a component in the operating system that generates and maintains a display of data in the desktop environment. In another of these embodiments, the first agent 202 includes a component that provides the first agent 202 with functionality for storing window attribute data or transmitting display instructions to the operating system; for example, the first agent 202 may include a dynamically-linked library component for maintaining or modifying taskbar data. In some embodiments, the transmitter is in communication with a receiver in the first agent 202 that receives window attribute data 210 and output data 208 from the second agent 204. In one of these embodiments, the receiver within the first agent 202 receives data from the second agent 204 and forwards the received data to the transmitter, which sends instructions to the operating system based upon the forwarded data. In other embodiments, the first agent 202 includes a component for storing data received from the second agent 202, such as, by way of example, window attribute data.

Figure 4A:
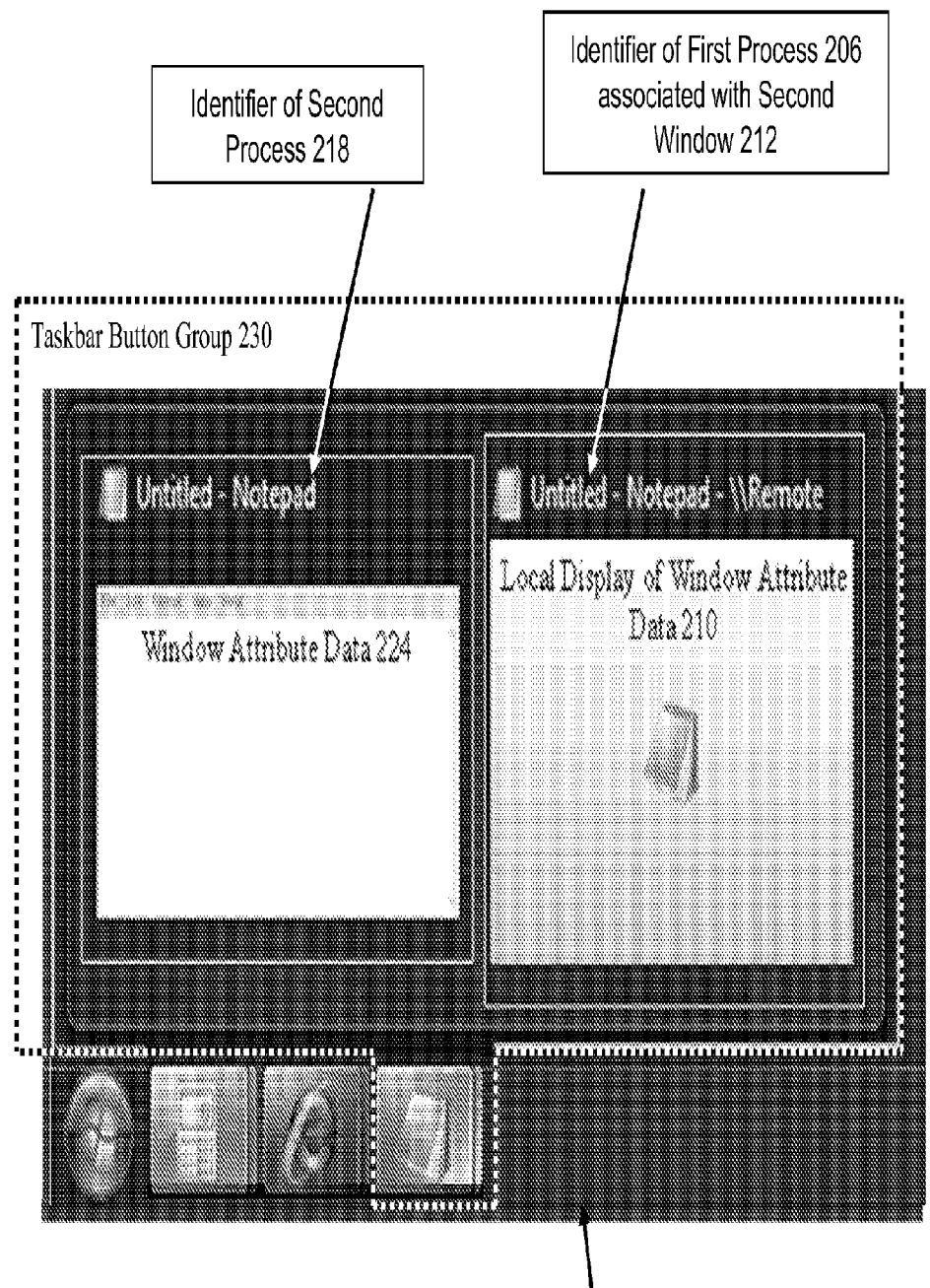
FIG. 4A is a screen shot depicting one embodiment of a combined display of taskbar button group entries generated on a local machine and on a remote machine.

In some embodiments, window attribute data 210 or output data 208 may comprise an icon representative of the first window 207 or first process 206. In another embodiment, window attribute data 210 or output data 208 may comprise an icon of the application or process that generated the window. In many embodiments, the first agent 202 may receive an icon or bitmap of an icon of the first process 206 or first window 207 for display within a taskbar 226 or other user interface element as a local display of window attribute data 210. Accordingly, when a taskbar button group is interacted with by a user of local computing device 102, the taskbar button group may display the received icon and/or text comprising the title of second window 212, the first window 207, or first process 206. Referring ahead briefly, an example screenshot of one such embodiment is shown in FIG. 4A, illustrating display of a notepad icon of a remote process. As shown in FIG. 4A, in these embodiments, the taskbar button group may display an icon for a remote application and a thumbnail for a local application.

Referring back to FIG. 2, in another embodiment, first agent 202 may receive a static screenshot or bitmap of output data of a first window, for display in a taskbar button group. In some embodiments, such screenshot or bitmap may be reduced in scale. For example, output data may comprise a 400 by 400 pixel window, but second agent 204 may send a 40 by 40 pixel thumbnail for display in the taskbar button group. This may reduce bandwidth requirements. Such static screenshots may be sent periodically, or responsive to user commands. For example, in one embodiment, first agent 202 may detect user interaction with the taskbar button group, interaction with a 3D or flip-3d interface, or input of an alt-tab or similar command. Responsive to detection of such interaction, in one embodiment, the first agent 202 may request a refresh of output data 208 of a window or request redraw of output data 208, receive such refreshed or redrawn output data 208, and may display a thumbnail of the newly received output data in the taskbar button group or other user interface element. In another embodiment, responsive to detection of the interaction, the first agent 202 may request a new, redrawn, or refreshed static thumbnail of the output data as discussed above.

In some embodiments, taskbar 226 may comprise functionality for displaying either an icon of an application, or a thumbnail image. In some embodiments, such thumbnail image may be rendered by taskbar 226 from the contents of a local window, while in other embodiments, the thumbnail image may be generated by another element, such as a shell 214 or local desktop environment 220, or may be retrieved from a memory element. Similar to this latter option, an application icon may be stored as a bitmap in a memory element, and taskbar 226 may retrieve the application icon from the memory element for display. Accordingly, in one embodiment, taskbar 226 may comprise functionality for retrieving an image or bitmap from a memory element and displaying the image or bitmap, agnostic to whether the image or bitmap is an icon or thumbnail. Described another way, a thumbnail image of window output may be stored as if it were an application icon, and taskbar 226 may be directed to display the thumbnail image as if it were any other application icon. This may allow for display of thumbnail images on legacy systems that only have the capability of displaying application icons.

Some versions of operating systems utilizing a taskbar may use one or more identifiers to group buttons in the taskbar. For example, Windows 7, manufactured by the Microsoft Corporation, uses AppIDs set for each window to determine how to group taskbar buttons corresponding to each window. In some embodiments, these AppIDs may be explicitly set by an application manufacturer. For example, the AppID for Microsoft Word may be explicitly set by Microsoft. When the operating system detects two taskbar buttons with an AppID corresponding to Microsoft Word, the operating system may group these buttons into a single taskbar button group. In other embodiments, AppIDs may be implicitly set. One such method involves the file system path to the process that created the window. For example, if an application is at C:\Program Files\My Company\My Application.exe, then the system may translate this file system path into a string to use as the AppID. If the application generates multiple windows, they will each have identical AppIDs, and may be appropriately grouped.

Some other versions of operating systems use just the file system path for taskbar button grouping. For example, Windows XP or Windows Vista, also by Microsoft Corporation, use just the latter method discussed above of file system paths to determine taskbar button grouping. This presents two difficulties with local display of application output from remote applications. First, the remote application that initially generated a window may have a different file system path, particularly with server-side virtualization techniques. Second, the local client may generate a window for application output, and thus the operating system may consider the path to the local client to be the proper file system path.

To remedy this, in some embodiments, the remote application may send remote window configuration information including the application's file system path. The local client may modify this file system path by replacing a portion of the path with a predetermined local path. For example, the remote application may be located at D:\Application Server\Remote Applications\Program Files\My Company\My Application.exe. Upon receipt, the local client may modify this path to replace the first portion, up to "Program Files", for example, with a globally unique identifier referring to the local system drive and path to the corresponding Program Files folder. This new file system path may thus comprise a combination of a local path and a remote path, and thus may be referred to as a hybrid file system path.

Referring briefly to the mechanics of taskbar grouping, different operating systems use different mechanisms for grouping taskbar buttons. For example, in many embodiments, Windows 7, discussed above, allows arbitrary grouping of taskbar buttons through associations with groups. However, Windows XP and Vista, among other operating systems, use a list representing the taskbar, with entries tagged as button groups separating entries representing a button. For example, if a list includes "Group 1, Button A, Group 2, Button B, Group 3, Button C, Button D, Button E," there will be three groups, the first two with one button each, and the third with three buttons. By default, the system may be configured to hide from display in the taskbar button groups with one button, and hide buttons in a group with a plurality of buttons. With these hidden entries not shown, the taskbar button group above would show as "Button A, Button B, Group 3," with the button for Group 3 representing three active windows.

In some embodiments, moving a button from one group to another may be performed by editing this list or changing the association of a button and group. In one embodiment, the local client may generate a new window for application output. In some embodiments, this new window may be created as part of the button group corresponding to the local client. The local client may determine a taskbar button group identifier for the new window using any of the methods discussed above. In some embodiments, the local client may search the taskbar to determine if an existing button group exists that comprises a similar identifier. For example, if a button group already exists for a notepad application, and the new window has a taskbar button group identifier corresponding to a notepad application, the local client may determine that a proper button group already exists. The local client may then move this button entry in the taskbar list to be within the button group. If the local client determines that no proper button group exists (for example, if no corresponding application is running locally or if no button group has been created for another window of the same remote application), the local client may create a new button group in the taskbar list based on the taskbar button group identifier, and move the button corresponding to the new window to this newly created button group.

Figure 3:
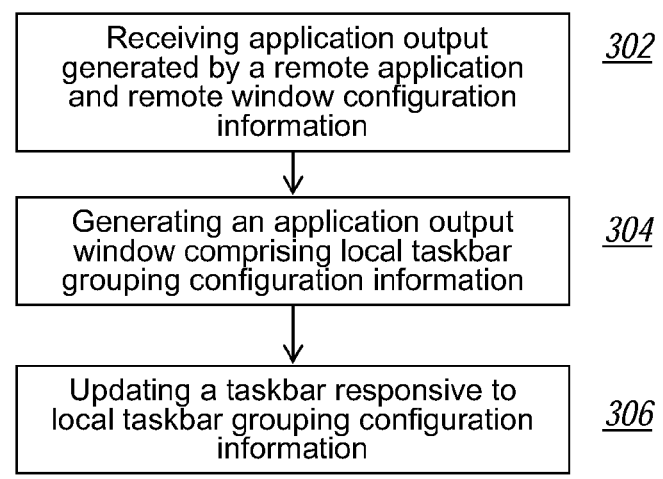
FIG. 3 is a flow diagram depicting one embodiment of a method for displaying, in a user interface element generated and displayed by a local machine, an identification of graphical data generated and displayed on the local machine and an identification of graphical data generated on a remote machine and displayed on the local machine.

Referring now to FIG. 3, a flow diagram depicts one embodiment of a method for displaying, in a taskbar generated and displayed by a local machine, an identification of graphical data generated and displayed on the local machine and an identification of graphical data generated on a remote machine and displayed on the local machine. In brief overview, the method 300 includes receiving, by a local client executing on a local machine, application output generated by a remote application executing on a remote computer, and remote window configuration. The method includes generating, by the local client, an application output window for displaying the received application output, the application output window comprising local taskbar grouping configuration information. The method also includes updating a taskbar, by an operating system, shell, GUI or other process of the local machine, responsive to the local taskbar grouping configuration information.

Referring now to FIG. 3, and in greater detail, a first agent (referred to variously as a first agent or local client) executing on a local machine receives, from a second agent (referred to variously as a second agent or remote client) executing on a remote machine or computer, application output generated by a remote application executing on the remote machine or computer, and remote window configuration information. Such remote window configuration information may comprise details about the window, including a handle, size, position, transparency value, or other window details, and/or information about the process that generated the window, including a process name, file system path to the process, process ID, group ID, process description, parent process ID, parent-child relationship, or other process information. In one embodiment, the second agent 204 queries a component of the operating system executing on the remote machine 106, to retrieve an identification of the first window 207. In another embodiment, and by way of example, the second agent 204 retrieves an Application User Model ID (referred to interchangeably as an Application User Model ID, AppUserModelID, or AppID) for the first window 207 and transmits the identifier to the first agent 202 on the local machine 102. For example, but without limitation, in one embodiment the second agent 204 may use a shell interface such as the GetValue( ) method of the IPropertyStore interface provided in some versions of Microsoft Windows to retrieve the PKEY_AppUserModel_ID property of the window. In still another embodiment, the second agent 204 queries a component of the operating system executing on the remote machine 106, to retrieve an identification of the first process 206 that generates the output data 208 and window attribute data 210 forming the first window 207; for example, the second agent 204 may use an application programming interface to query a dynamically linked library component of the operating system. By way of example, but without limitation, in some embodiments, the second agent 204 may use an API provided by the operating system, such as the NtQueryInformationProcess API provided in some versions of Microsoft Windows in the ntdll.dll library. By using a decimal parameter value of 50 for the parameter ProcessInformationClass, the second agent 204 may retrieve a structure of struct {UINT nAppIdLaunchFlags; USHORT nBufferLengthInBytes; WCHAR szAppUserModelID[1];}. In one embodiment, the nAppIdLaunchFlags may comprise a bitmask with flags indicating whether the szAppUserModelId string refers to a process' explicit App ID. In one such embodiment, a hexadecimal flag of 0x1000 being set may indicate that the App ID is explicitly set in the szAppUserModelId field. If the flag is not set, in this embodiment, the szAppUserModelId field may be ignored. In still another embodiment, the second agent 204 gathers the various processes' information using a window handle, when creation of a new window is detected. In still even another embodiment, the second agent 204 receives an identification of the first process 206 from an operating system executing on the remote machine 106 when the first process 206 is created. In a further embodiment, the second agent 204 receives an identification of the first process 206 when the first process 206 is created, even if no new window has been created for the first process 206. In yet another embodiment, the second agent 204 transmits process data, including Process ID, to the first agent 202.

In some embodiments, an Application User Model ID may be explicitly established. For example, in these embodiments, the Application User Model ID may be a string entered by a manufacturer or developer of an application to identify the company name, product name, product version, or any other information to identify the application or process. In other embodiments, the Application User Model ID may be implicitly established. For example, in these embodiments, the Application User Model ID may comprise a string generated by the operating system or a process, module, daemon, or other logic, and may include a Process ID (PID), User ID (UID), file location or path, file description, time of launch, memory register number, or any other information available to the operating system or other logic to identify the application or process. In still other embodiments, an application or process may have both an explicit identifier and an implicit identifier, as discussed above. In a further embodiment, the explicit identifier may take precedence over the implicit identifier. Accordingly, when executing the methods described herein on such an application or process, an explicit identifier may be preferentially used, if it exists. In many embodiments, the window configuration information may comprise a single identifier and may include a flag or bit set to a predetermined value to designate whether the identifier is explicitly set or implicitly set.

In some embodiments, the second agent 204 transmits both an identifier of the first window 207 and an identifier of the first process 206. In other embodiments, the second agent 204 transmits only the identifier of the first window 207. In still other embodiments, the second agent 204 transmits only the identifier of the first process 206.

In one embodiment, the first agent 202 receives at least one of an identifier of the first window 207 and an identifier of the first process 206. In another embodiment, a component within the first agent 202—such as, by way of example, a dynamically linked library component—receives the at least one of an identifier of the first window 207 and an identifier of the first process 206. In some embodiments, the first agent 202 stores the received identifiers. In one of these embodiments, the first agent 202 stores the received identifiers in an in-memory hash table.

In some embodiments, at step 304, the first agent 202 may generate a second window 212, also referred to as an application output window, for display on the local machine 102. In one of these embodiments, the first agent 202 directs the display in the second window 212 of the output data 208 generated by the first process 206 on the remote machine 106. In another of these embodiments, the first agent 202 directs the formation of the second window 212 according to the window attribute data 210 specified by the first process 206 for the first window 207 on the remote machine 106.

In some embodiments, the first agent 202 or local client may associate the second window with the identifier of the first process. In other embodiments, the second window may be generated to include the remote window configuration information. In one embodiment, the first agent 202 assigns the received identifier of the first window 207 to the second window 212. For example, but without limitation, in one embodiment the first agent 202 may use a shell interface such as the SetValue( ) method of the IPropertyStore interface provided in some versions of Microsoft Windows to set the AppUserModel_ID property of the window. In another embodiment, the first agent 202 assigns the received identifier of the first process 206 to the second window 212. In still another embodiment, the first agent 202 assigns an application user model identifier of the first window 207 to the second window 212. In another embodiment, the first agent assigns an application identifier generated by a shell executing on the remote machine 106. In still even another embodiment, the first agent 202 generates a new identifier for the second window 212 based upon the received identifier of the first process 206. In such an embodiment, the first agent 202 may assign the generated new identifier to the second window 212. In yet another embodiment, the first agent 202 replaces an existing identifier in window attribute data for the second window 212—which may be, for example, an identifier of the first agent itself—with the received identifier of the first process 206. In many embodiments, these identifiers may comprise local taskbar grouping configuration information. For example, a window may be generated with an application identifier, AppID, process name, process file system path, or other identifier, and an operating system or taskbar may group the window with other windows in a taskbar responsive to the identifier or responsive to the identifier's similarities with other windows' identifiers.

In some embodiments, the first agent 202 may determine that the first process 206 and the second process 218 are substantially similar. In one of these embodiments, the first agent 202 determines that the identifiers of the first process 206 and of the second process 218 are substantially similar; for example, the first agent 202 may compare process module data associated with the first process 206 and the second process 218 or the first agent 202 may compare an attribute of a window generated by the second process 218 with window attribute data generated by the first process 206. In still other embodiments, the first agent 202 directs the combination of the display of the identifier of the second window 212 with the display in the taskbar button group 230 based upon determining that the first process 206 and the second process 218 are substantially similar. In further embodiments, the first agent 202 uses received process executable file path data to identify a taskbar button group 230 with which to associate the second window 212. In one of these embodiments, the first agent 202 uses received process executable file path data to determine that a new taskbar button group 230 should be generated for the second window 212; the first agent 202 may then direct the generation and display of the new taskbar button group 230.

In one embodiment, the first agent 202 retrieves an enumeration of identifiers of toolbar buttons displayed in the taskbar; for example, the first agent 202 may execute a call to query the operating system for the enumeration (such as, without limitation, a "TB_GETBUTTON" command). In another embodiment, the first agent 202 associates an enumerated identifier of a toolbar button with the identifier of the first window 207; for example, the first agent 202 may create a mapping between the received identifier of the first window 207 and an enumerated identifier of a toolbar button. In still another embodiment, the first agent 202 creates an index of windows to be identified in a taskbar button group 230. In another embodiment, the first agent 202 adds an identifier of the second window 212 (which may be the identifier of the first window 207) to the created index. In still another embodiment, the first agent 202 determines that the third window 216 is generated by a substantially similar process as the first process 206 and, responsive to this determination, adds an identifier of the third window 216 to the created index. In another embodiment, the first agent 202 creates a taskbar button group populated by identifiers stored in the created index. In one such embodiment, the taskbar button group may have a button style of BTNS_DROPDOWN. In another such embodiment, creating the taskbar button group may comprise using a command such as TB_MOVEBUTTON to populate the group.

In some embodiments, the first agent 202 may group taskbar buttons responsive to explicit identifiers of processes being substantially similar. For example, each window may have an explicit identifiers set by a developer or manufacturer of an application that generated the window, allowing an operating system to accordingly group these windows. Using the techniques discussed above, an identifier of a window generated by a remote application on a remote system may be associated with a corresponding window generated on a local system by a different local application, allowing the locally generated window to use the identifier of the remote window, and further allowing the locally generated window to be grouped with other local windows of the same applications. For example, a browser application executing on the remote system may generate a window and explicitly set an identifier that includes the browser name. Display data from this window may be passed to a local machine executing a remote display application, such that the remote display application can generate a corresponding window containing the display data. Rather than using the display application's identifier, the generated window may be set to have the identifier of the window generated by the browser on the remote display application. If the local machine is also executing a copy of the browser application, windows generated by the local browser may be thus grouped with the window generated by the remote display application, providing a seamless interactive environment for the user.

Similarly, in other embodiments, the first agent 202 may group taskbar buttons responsive to implicit identifiers of processes being substantially similar. For example, if an explicit identifier was not set by a developer or manufacturer of an application or process, windows may still be generated with implicit identifiers as discussed above in connection with FIG. 2, and grouped as discussed above with explicit identifiers. In some embodiments, explicit identifiers and implicit identifiers may be differentiated by the presence of a flag or identifier that indicate whether the identifier was generated by the system.

In some embodiments, a shell executing on the local machine may display, in a taskbar button group, a display of i) an identification of the second window and ii) an identification of a third window, the third window generated by a second process executing on the local machine and displayed on the local machine, responsive to the association of the second window with the identifier of the first process (306). In one embodiment, the shell 214 receives the identification of the second window 212—which the first agent 202 has modified to be, by way of example, either the identifier of the first window 207 or the identifier of the first process 206. In another embodiment, the shell 214 displays the identification of the second window 212 with the identifiers of other windows generated by applications substantially similar to the first process 206. In still another embodiment, and by way of example, the shell 214 receives the identification of the second window 212 (which is the identification of the first process 206), determines that a taskbar 226 shown on the local desktop environment displays a taskbar button group 230 for a similar process executing locally, and combines the display of the identifier of the second window 212 with the display in the taskbar button group 230; for example, and without limitation, the shell 214 determines that the identifier of the second window 212 indicates the first process 206 is a word processing application such as MICROSOFT WORD, determines that an existing taskbar button group 230 on the taskbar displays identifiers of windows generated by a locally-executing instance of MICROSOFT WORD, and adds the identifier of the second window 212 to the display by the taskbar button group 230.

In some embodiments, a user may specify whether to enable or disable the functionality for combining a display of taskbar button group entries generated on a local machine and on a remote machine. In other embodiments, a user may specify that the system is to group remotely generated taskbar button group entries together, and separately from locally generated taskbar button group entries.

In some embodiments, as described above, a user of a local machine 102 connects to a remote machine 106 and views a display on the local machine 102 of a local version of a remote desktop environment, comprising a plurality of data objects, generated on the remote machine 106 and an application or other resource accessible via an integrated desktop environment—both those resources generated on the local machine 102 and those generated on the remote machine 106—is shown on the remote desktop environment as if it were executing on, or executable from, the remote desktop environment. In one of these embodiments, a component on the local machine 102 (e.g., the first agent 202) integrates remotely generated windows into a local desktop environment. In another of these embodiments, a component on the remote machine 106 integrates windows generated on the local machine 102 into a desktop environment generated by the remote machine 106. In still another of these embodiments, although the local machine 102 is described above as the machine accessed by a user and the remote machine 106 is described above as the machine that transmits window attribute data and output data for integration by the local machine 102, the inverse is implemented—that is, the local machine 102 provides the functionality described above as provided by the remote machine 106 (including, for example, gathering and transmitting process data for integration into a desktop environment) while the remote machine 106 provides the functionality described above as provided by the local machine 102 (including, for example, receiving process identification data and directing the integration of the received data into a desktop environment). In such an embodiment, when a local process executing on the local machine 102 is integrated with a remote desktop generated by a remote machine 106, the representation of the process executing on the local machine 102 is shown in a taskbar within the remote desktop environment and grouped in a taskbar button group 230 including identifications of substantially similar processes executing on the remote machine 106. In yet another of these embodiments, the remote machine 106a receives process data associated with a process executing on a second remote machine 106b. In such an embodiment, the remote machine 106a integrates a representation of the process executing on the second remote machine 106 in a taskbar within the remote desktop environment and groups the representation in a taskbar button group 230 including identifications of substantially similar processes executing on the remote machine 106a.

Referring now to FIG. 4A, a screen shot depicts one embodiment of a combined display of taskbar button group entries generated on a local machine and on a remote machine. The taskbar 226 includes a taskbar button group 230. In the example depicted by FIG. 4A, the taskbar button group 230 displays an identifier of each window generated by a word processing process (in this case, the process is NOTEPAD). In some embodiments, the identifier of the window is an alphanumeric string contained in the window attribute data (e.g., the title of the window). In other embodiments, the identifier of the window also includes a "thumbnail" depiction of the output data generated by a process; for example, as shown in FIG. 4A, the taskbar button group 230 may include a small version of the text displayed in the word processing window as part of the identifier of the window. As shown in FIG. 4A, more than one taskbar button group 230 may simultaneously be shown. For example, in FIG. 4A, three button groups are shown: the leftmost taskbar button group includes two stacked icons representing executing calculator applications or processes; the middle taskbar button group includes two stacked icons representing separate instances of an internet browser application or process; and the rightmost taskbar button group shows two stacked icons of a notepad application. Furthermore, the rightmost taskbar button group is expanded, responsive to a mouse click or hover in some embodiments, to show displays 224 and 210 and identifiers 218 and 206.

In some embodiments, window attribute data includes text forming a title to the window, such as a name of a file displayed in the window. In other embodiments, the identifier of the process that generates the window (such as the identifier of the second process 218 or the identifier of the first process 206 associated with the second window 212) is included in window attribute data (such as window attribute data 224 or window attribute data 210). In one of these embodiments, the identifier of the process is provided implicitly, in the form of process module data. In another of these embodiments, the identifier of the process is provided explicitly, in the form of an application identifier (e.g., AppID). In still other embodiments, the visual text identifier forming the title is different from the application or process identifier or application identifier. In one such embodiment, the visual text identifier may be generated responsive to the application or process name or application identifier, while in another such embodiment, the visual text identifier may be generated responsive to a window title, string, or other explicit or implicit identifier. For example, in one such embodiment, an application identifier may be based off a string such as CompanyName.ApplicationName, and the visual text identifier may be simply the ApplicationName. In some embodiments, the first agent 202 enables a display in a single taskbar button group 230 of identifiers of both windows that are generated by locally executing applications and of windows that are generated by remotely executing applications.

Figure 4B:
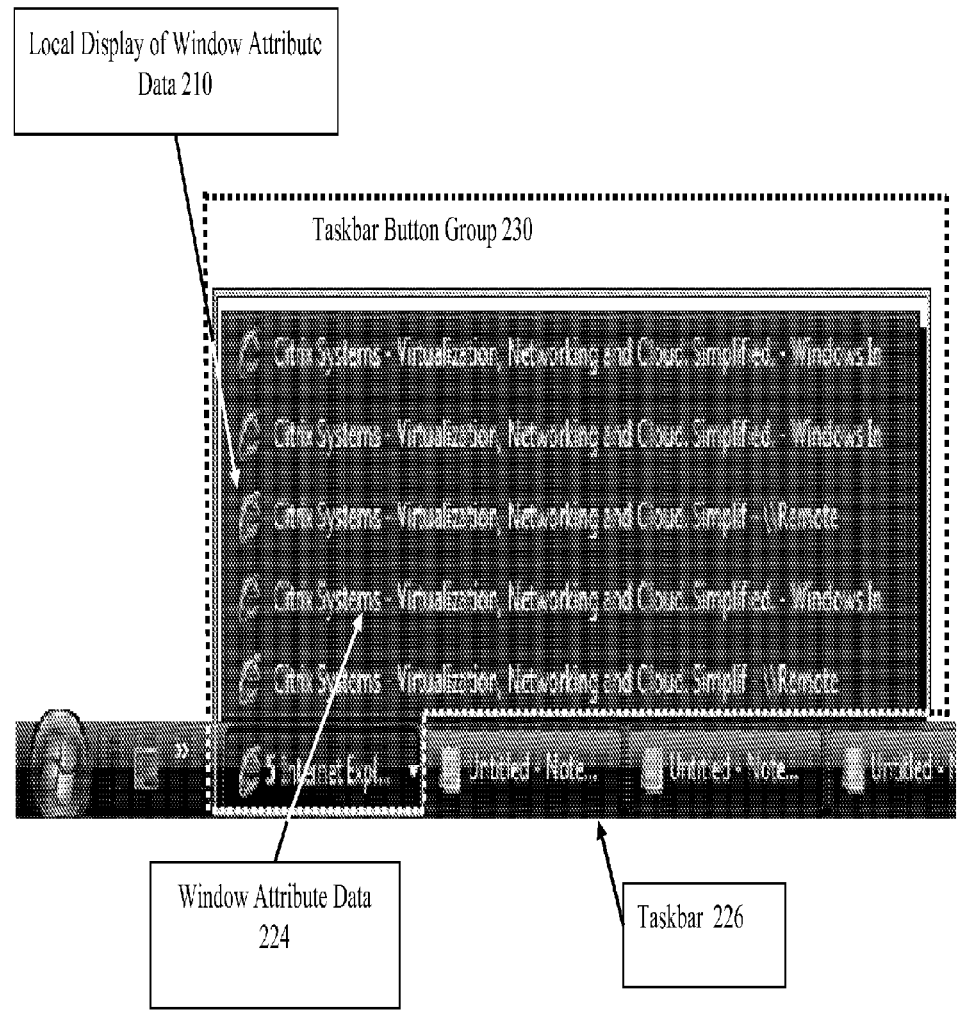
FIG. 4B is a screen shot depicting one embodiment of a combined display of taskbar button group entries generated on a local machine and on a remote machine.

Referring now to FIG. 4B, a screen shot depicts another embodiment of a combined display of taskbar button group entries generated on a local machine and on a remote machine. As shown in FIG. 4B, in some embodiments, the window attribute data displayed in the taskbar button group is an alphanumeric string (e.g., "FILENAME—PROCESS NAME") shown in conjunction with an icon representing the process generating the window (e.g., the stylized "e" representing MICROSOFT INTERNET EXPLORER).

In some embodiments, as discussed above, the window attribute data displayed in the taskbar button group 230 includes a graphical representation of the window, which may include a graphical representation of the process (e.g., the icon and the identifying alphanumeric string). In still other embodiments, the taskbar button group 230 displays an icon (such as a shortcut icon), the icon providing functionality to a user, such as the ability to initiate execution of an associated application. In one of these embodiments, by way of example, by clicking on the displayed icon, a user of the local machine 102 can initiate execution of the application associated with the icon. In another of these embodiments, the first agent 202 communicates with the shell 214 to group the local shortcut icon with the identifier of the second window 212. In still another of these embodiments, the first agent 202 associates an identifier of the first process 206 with the second window 212 and with a shortcut to a locally-executing version of the first process 206; for example, the first agent 202 may determine that the identifier of the first process 206 and an identifier of the second process 218 are substantially similar (e.g., the second process 218 is a locally-executing version of the first process 206) and, based on that determination, associate the second window 212 with a shortcut to the second process 218. As discussed above in connection with FIG. 4A, multiple taskbar button groups 230 may simultaneously be displayed in the taskbar 226. Furthermore, as shown in FIG. 4B, some applications or processes may be grouped, such as the five instances of web browser processes illustrated, while other applications or processes may be left ungrouped, such as the three instances of notepad processes illustrated.

In some embodiments, the window attribute data displayed in the taskbar includes an identification of a type of data displayed by the window. In one of these embodiments, by way of example, substantially similar types of processes may generate and display substantially different types of data—for example, a first process that allows a user to view data on remote machines such as an Internet browsing application may display multiple different web pages while a second Internet browsing process is dedicated to the display of a web-based application. In another of these embodiments, the first agent 202 may direct the grouping of taskbar buttons by type of data—such as by combining identifications of Internet browsing processes that display web pages in a first taskbar button group 230 while combining identifications of Internet browsing processes that display web-based applications in a second taskbar button group 230b. In still another of these embodiments, each substantially different web-based application is assigned a separate taskbar button group. In yet another of these embodiments, the first agent 202 uses received application identifiers to determine whether substantially different types of data are displayed in windows associated with processes of substantially the same type; for example, such application identifiers may include, without limitation, administrator-defined identifiers, identifiers specified by a web-based application, and window attribute data (such as, without limitation, title, icon, or other visual or internal web-based application identifier).

In some embodiments, by using data about the process 206 that hosts and creates a given host window 207 that is displayed locally as the second window 212—and, in particular, data associated with information about the window 207 that is displayed on a taskbar on a desktop environment generated on the local machine 102—a destination taskbar group with which to associate the local version of the window can be determined, and the taskbar buttons for the remote application's windows can be moved to this destination group.

Figure 4C:
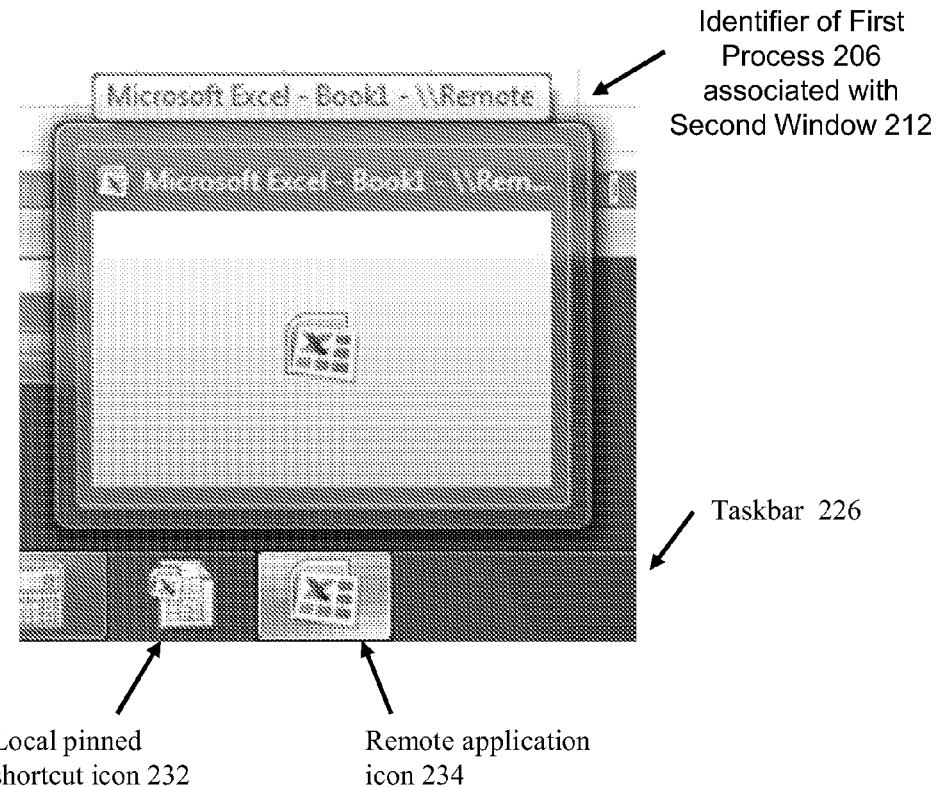
FIG. 4C is a screen shot depicting one embodiment of ungrouped icons representing entries generated on a local machine and on a remote machine.
Figure 4D:
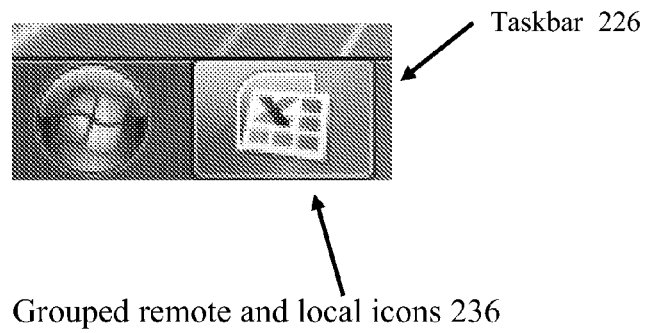
FIG. 4D is a screen shot depicting one embodiment of grouped icons representing entries generated on a local machine and on a remote machine.

Referring now to FIG. 4C, shown is a screen shot depicting one embodiment of a task bar 226 with ungrouped icons representing entries generated on a local machine 232 and on a remote machine 234. For comparison, shown in FIG. 4D is a screen shot depicting one embodiment of a task bar 226 with grouped icons 236 representing entries generated on a local machine and on a remote machine. Referring back to FIG. 4C, in some embodiments of user interfaces provided by an operating system or shell, a user or administrator may create a shortcut icon to launch an application, process, file, or folder. In many embodiments, the operating system or shell allows this shortcut icon to be placed in the taskbar or "pinned," such that the shortcut icon remains regardless of the launch or open state of the application, process, file, or folder. In some embodiments of systems for providing remote access to applications, the user or administrator may create a shortcut icon to launch an application, process, file, or folder on the remote machine. For example, in one such embodiment, rather than first launching a remote desktop or remote access application or visiting a remote access application launch website and then selecting a remote application, process, file, or folder to launch, a user may create a shortcut directly to said remote application, process, file, or folder. This may, in some embodiments, be referred to as a shortcut to a published remote application, process, file or folder.

In many embodiments of such systems, these published remote applications, processes, files, or folders may represent arguments given to another application that provides a remote access connection. For example, although a shortcut for a published remote application may appear to be an icon for a spreadsheet program, it may actually first launch a second application that establishes a remote access connection to a server, performs various authentication and log-in tasks, and initiates execution of the remote spreadsheet program. As such, in some embodiments, the shortcut may be owned by or associated with the second remote access application. As a result and as shown in the example in FIG. 4C, an operating system may not properly group a pinned shortcut to the published remote spreadsheet program or file with a pinned shortcut to a local spreadsheet program or file. This may result in a non-intuitive or non-seamless user experience.

Accordingly, in some embodiments of the techniques and systems discussed above, published remote applications, process, files, or folders may be tagged or identified with an explicit association or partial association to a remotely generated window corresponding to the published remote applications, processes, files, or folders. For example, although the shortcut for a remote spreadsheet program may be owned by a remote access application, as discussed above, when created, the shortcut may be tagged to include an identifier of the remote spreadsheet. Accordingly, the shortcut may be grouped with other locally generated or remotely generated spreadsheet windows, and on launch of the shortcut, windows of the remote spreadsheet may be properly grouped with other windows using the techniques and systems discussed above.

C. Systems and Methods for Updating a Dock with a User Interface Element Representative of a Remote Application Some operating systems, including the Macintosh Operating System manufactured by Apple, Inc., utilize an application-centric user interface or dock instead of a window-centric interface, such as the Microsoft Windows taskbar. A window-centric interface, such as a taskbar, may include a button for each window. For example, a user who has three word processor documents currently open may see three buttons, one for each document. In some embodiments, these buttons may be stacked or grouped. By contrast, an application-centric interface may only show one button or icon, indicating the word processor application. In many embodiments, responsive to user interaction with this button, the dock or application-centric interface may show an enumeration of the three documents in a menu or other grouping, an option to hide all of the application windows, an option to quit the application, and/or an option to bring one of the windows to the foreground or focus. Because grouping of windows in these interfaces is based upon the application that generated the window, windows generated by a local client but displaying application output of a remote application may present difficulties.

Figure 4E:
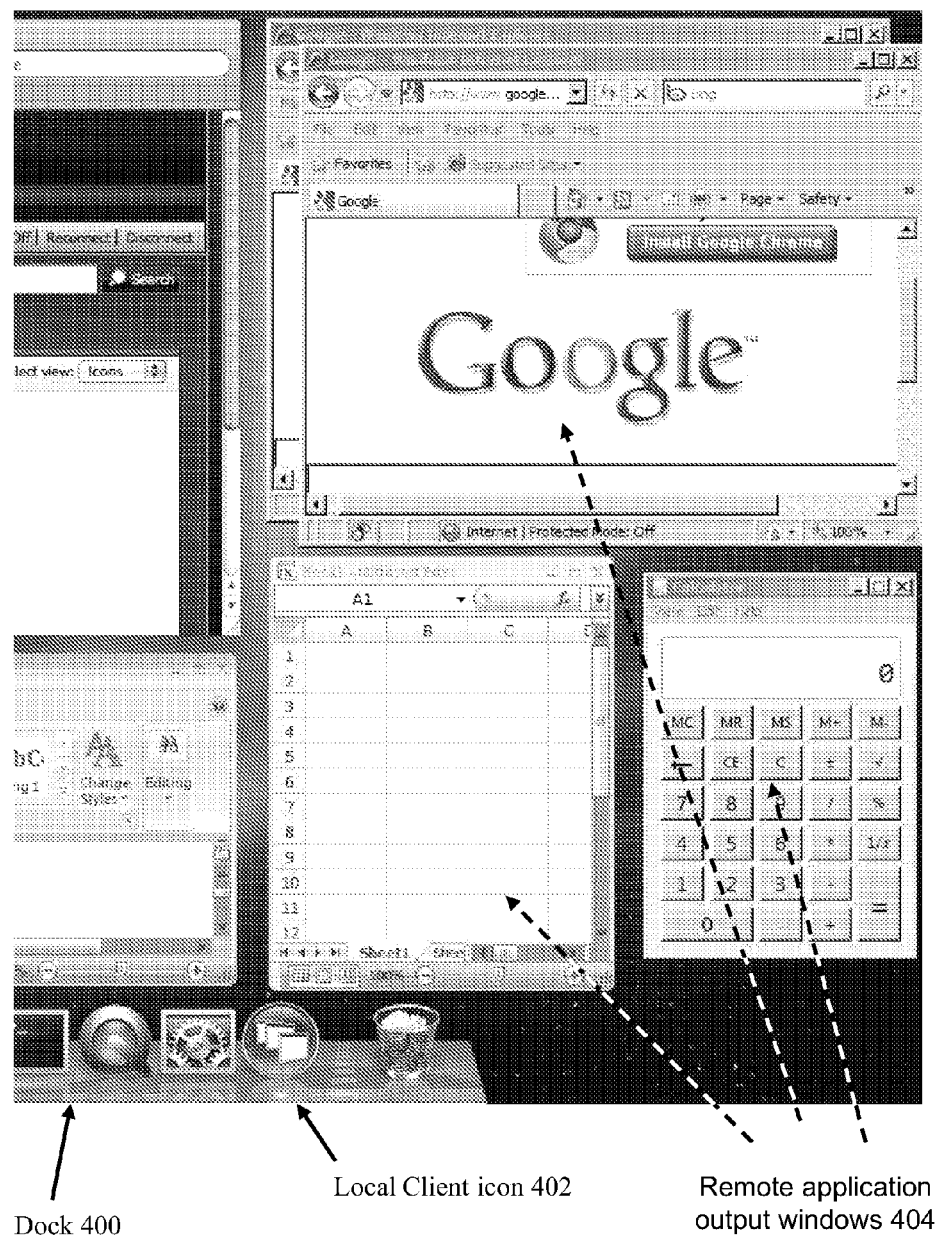
FIG. 4E is a screen shot depicting one embodiment of a dock with a user interface element representative of multiple remote applications executing on a remote machine.

For example, in the screen shot of one such embodiment shown in FIG. 4E, a dock 400 includes an icon 402 of a currently executing local client. In this example, the local client has generated three application output windows 404, for a remotely executing word processor, spreadsheet, and calculator. However, because the local client generated the windows, the dock 400 only displays the icon 402 of the local client. This may result in confusion for a user, particularly when interacting with similar local and remote applications, such as a local word processor and a remote word processor.

Figure 4F:
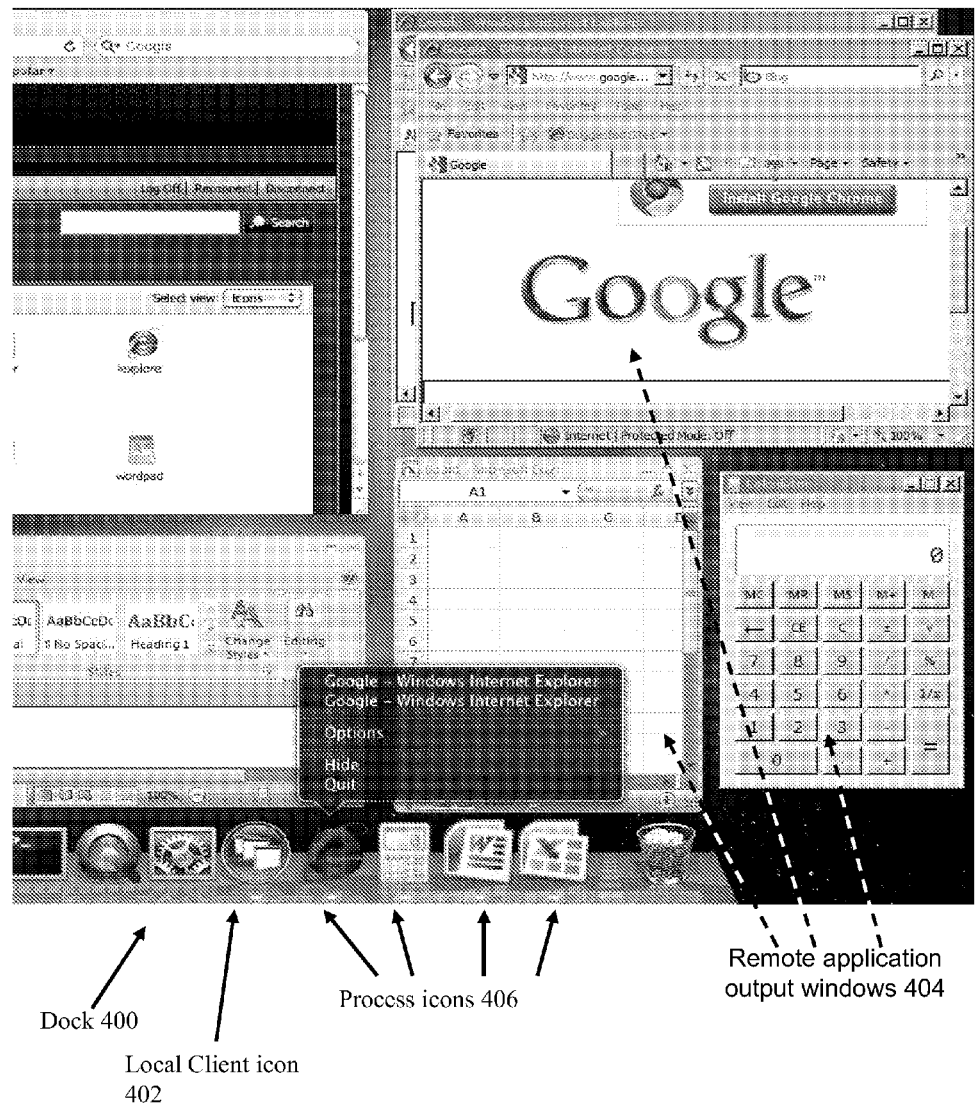
FIG. 4F is a screen shot depicting another embodiment of a dock with a user interface element representative of each remote application executing on a remote machine.

A screen shot of one embodiment of a solution to this problem is shown in FIG. 4F. As shown, dock 400 includes the icon 402 of the currently executing local client. Although shown as visible, in many embodiments, the icon 402 of the currently executing local client may be hidden, so that it is not displayed in the dock 400. For example, the local client may run as a background application, such that the icon is not displayed. In another example, the client may not run as a background application, but include an attribute or setting indicating that an icon should not be displayed in the dock 400. As shown, dock 400 also includes process icons 406 representing the remotely executing applications for which the local client has generated application output windows. For example, process icons 406 include an icon for a remotely executing web browser with two windows, a remotely executing calculator, a remotely executing word processor, and a remotely executing spreadsheet. In response to a user interaction with one of the icons, such as the web browser icon, in some embodiments, the dock may display a menu with an enumeration of one or more application output windows corresponding to windows of the remotely executing application.

Figure 4G:
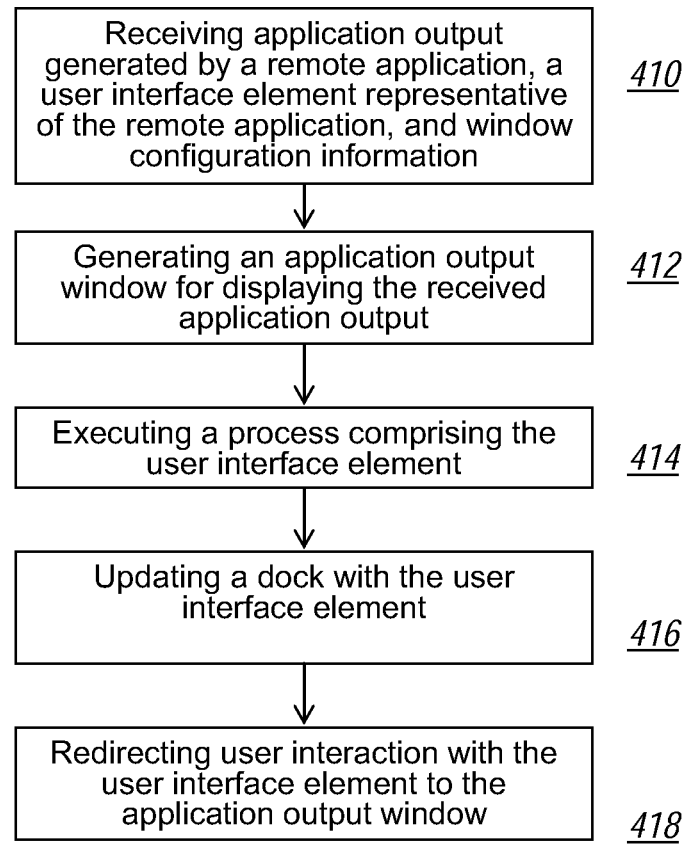
FIG. 4G is flow diagram depicting one embodiment of a method for updating a dock with a user interface element representative of a remote application executing on a remote machine.

Referring now to FIG. 4G, shown is a flow diagram of one embodiment of a method for updating a dock, generated and displayed by a local computer, with a user interface element representative of a remote application executing on a remote computer. In brief overview, at step 410, in one embodiment, a local client executing on a local computer receives application output generated by a remote application executing on a remote computer. At step 412, the local client generates, responsive to receiving the application output, an application output window for displaying the received application output, the application output window generated according to the window configuration information. At step 414, responsive to receiving the application output, the local client initiates execution of a process on the local machine, the process comprising the user interface element representative of the remote application. At step 416, responsive to executing the process, a dock of the local computer is updated with the user interface element of the process. At step 418, the process redirects a user interaction with the user interface element in the dock to the application output window displaying the application output generated by the remote application.

Still referring to FIG. 4G and in more detail, at step 410, in some embodiments, a local client executing on the local computer may receive application output generated by a remote application executing on a remote computer. In some embodiments, the application output may comprise graphical data of a window via a remote display protocol or independent computing architecture protocol. In other embodiments, the application output may comprise commands including creating a window, deleting a window, moving a window, bringing focus to a window, making a window transparent or partially transparent, opening a menu, closing a menu, resizing a window, selecting a button or other element, or any other output data generated by an application. In some embodiments, the local client may also receive a user interface element representative of the remote application. In one embodiment, the user interface element may comprise an icon or image of an icon of an application. In another embodiment, this user interface element may comprise a static or dynamic thumbnail of the application output. In yet another embodiment, the user interface element may comprise a combination of dynamic data and an icon, such as a calendar icon that changes a displayed month and day with the passage of time. In some embodiments, the local client may also receive window configuration information corresponding to the application output. In one embodiment, the window configuration information may comprise information about an application output window, including size, position, focus, transparency, or other details. In another embodiment, window configuration information may comprise information about the window's relationship to the application, including whether it is a child of another window, the name and/or identifier of the application or process that generated the window, the file system path to the application or process that generated the window, whether the window was the first window generated by application, whether the window was generated by the operating system, or information about the user interface element, including its size. In some embodiments, window configuration information may include a process ID of a parent process, to establish a parent/child relationship with an initial published application process. This may be done to allow tracking of process hierarchies. In other embodiments, window configuration may include an application ID or App ID. This App ID may, in one embodiment, comprise the Microsoft Windows App ID set by the remote application. This may be used in window configuration regardless of the client executing a non-Microsoft operating system. In another embodiment, the App ID may comprise an App ID configured by an administrator, user, or manufacturer. In some embodiments, this may be done to either group or distinguish applications. For example, processes and windows that do not set their own App ID may be grouped or associated with an App ID by a user. Conversely, windows or applications that do include an App ID could be ungrouped to appear separately or in other groups. For example, App IDs may be used in this manner to distinguish between web applications and simple web pages, so that they do not get grouped under the same web browser dock icon. Web applications may thus be split to appear under one or more separate icons, and may be grouped by, for example, service provider or purpose.

In some embodiments, at step 412, the local client may generate an application output display window for displaying the received application output. The local client may, in some embodiments, generate an application output display window according to the window configuration information. For example, the local client may generate an application output display window of a specific size or type corresponding to a size referred to in the window configuration information. Furthermore, the local client may, in some embodiments, generate a window with a relationship to another window or reference to a process specified by the window configuration information.

In some embodiments, at step 414, a process may be executed on the local machine, responsive to receiving the application output. In some embodiments, the process may comprise the user interface element representative of the remote application. For example, responsive to receiving application output of a notepad application and a user interface element of a notepad application icon, a process including the icon may be executed. In an application-centric user interface, or dock, execution of such a process may result in the user interface element or icon appearing as an executing process in the dock. Thus, a user who has requested execution of a remote application such as the notepad application will see both a new window comprising the application output, and a new icon in the dock representing the application, just as if they had initiated execution of the same program locally.

In some embodiments, the local client may request an application icon for display in the user interface or dock. In some embodiments, the local client may request the icon at a predetermined size or with a specified height and width in pixels or other measurement. The remote machine may transmit the requested icon and the local client may, in some embodiments, cache the icon for later use. The local client may re-use a cached icon for later execution of the process. This may provide significant bandwidth reduction with multi-process applications. For example, without caching, a remote executing multi-process application such as Google Chrome may trigger execution of dozens of processes, all including the same icon, which may require large amounts of bandwidth to transmit. By caching the icon, network usage can be correspondingly reduced.

In some embodiments, the local client may initiate execution of the process. In one embodiment, the local client may create the process and then execute the process. In many embodiments, the process may comprise an application, daemon, script, or other functionality for redirecting user interaction with the process to an application output window. In one embodiment, the process may comprise a script, executing when the process is brought to the focus or foreground of the user interface, to bring another window to the focus or foreground. For example, if the process is created and executed responsive to the local client receiving application output generated by a remote notepad application, when a user clicks on the remote notepad process icon in the dock or uses an application switching interface (such as an alt-tab or command-tab sequence) to bring the process to focus, the process may execute a script directing the GUI to bring the application output window of the local client corresponding to the remote notepad application to focus. Thus, to the user, it will seem as if interacting with the process results in interacting with the application output window. In many embodiments, the process will have no windows of its own. Accordingly, in many embodiments in which the process comprises a script that only executes on interaction with the process, the process may have a very small memory footprint and very low CPU utilization.

In some embodiments, the process may correspond to multiple windows. As discussed above, in a window-centric interface such as a taskbar, there may be a button for each window of an application, while in an application-centric interface such as a dock, there may be a single icon for the application, regardless of the number of windows of the application or open documents in the application. Similarly, in some embodiments, the process may be executed once in response to the local client receiving application output generated by a remote application, regardless of the number of windows or documents open in the remote application. Accordingly, in some embodiments, the local client may receive additional application output associated with a second window generated by the remote application and additional window configuration information, and may generate a second application output window for displaying the additional application output. The local client may determine, responsive to the additional window configuration information, not to execute a second process for redirection of user interaction. For example, the local client may determine that both the first window and the second window were generated by the same application. In embodiments where the remote application is a multi-process application, such as Internet Explorer or the Google Chrome web browser, the local client may determine that although the first window and the second window were generated by separate remote processes, the two processes have the same name or same identifier, and thus should be grouped. In one embodiment, responsive to determining not to execute a second process, the local client may modify the process or script of the process to allow redirection to either the first or second application output window. For example, the local client may modify the process such that user interaction with the process icon in the dock displays a menu with an enumeration of the first and second windows. In some embodiments, the determination not to execute a second process may be made responsive to the additional application output being generated by the remote application, a second executing instance of the remote application, or a child process of the remote application. For example, an application, such as a drawing application, may generate a second window as a toolbox of icons to use various drawing tools. These windows may sometimes be referred to as "interesting windows" that should still be associated with the application. Such second window may be considered a child of the application, and the local client accordingly should not create a second process solely for the toolbox window. Similarly, in some embodiments, a first application may launch and create a window that serves as an intermediate process to launch a second application, which is actually used by the user. In such embodiments, it may be desirable to launch a process for the second application, but not the first application or first window, such that the first application or first window do not have an icon in the dock or user interface element. In such cases, the first application or first window may be launched as a background application or otherwise flagged such that a dock process is not executed for the application.

In one embodiment, a first application may initiate execution of a second application, but the first application may terminate prior to the second application starting. Terminating a process with an icon in the dock on termination of the first application and reexecuting the process icon when the second application executes may show unexpected or unwanted behavior with icons disappearing and reappearing. Accordingly, in these embodiments, the second application may be identified as a child of the first application, and termination of the process on termination of the parent application may be suspended, preventing the icon from disappearing.

In some embodiments, the local client may receive application output generated by the remote computer's operating system. For example, the local client may receive application output corresponding to a balloon pop-up, an alert, an error message, or any other window or output generated by the operating system. It may be undesirable or unexpected, from the user's point of view, for the local client to create and execute a process corresponding to the remote computer's operating system. Accordingly, in many embodiments, the local client may not create or execute a process for application outputs generated by a system process or similar process.

In another embodiment, the local client may decide to execute a second process upon receiving the additional application output. For example, some remote applications may be configured to display multiple documents within a single window of the application. On a large monitor, the application window may be expanded or made full-screen such that the multiple documents may be viewed side-by-side or simultaneously by a user. However, this may prevent a user from being able to view these multiple documents simultaneously with a document from another application, due to limited flexibility of moving the document windows because some may be constrained within the first application window. Accordingly, some users have noticed that they may be able to initiate multiple instances of these applications such that each instance displays a single document, restoring the ability to move each document window separately. Thus, in some embodiments in which a user has explicitly launched separate instances of an application, the local client may decide to execute additional processes for each separate instance, so as to maintain on the local machine the behavior expected by the user.

In another embodiment, as discussed above, a single process may generate multiple windows or spawn multiple processes that should be associated or grouped in various ways, responsive to their content, origin, or other attributes. For example, a web browser may include multiple windows or processes for multiple web pages. In many embodiments, these windows or processes may be grouped together and should be associated with a single process in a dock. However, in other embodiments, these windows or processes may be grouped in various ways relating to their functions. For example, in one embodiment, web pages may be grouped together, while web applications may be in a second group, or in individual groups, or in a mix of individual and multiple-member groups. For example, web applications provided by a service provider may be grouped together by the service provider. Likewise, web applications with the same function may be grouped together, such as web mail from multiple service providers. This grouping may be done based on identifiers in the application data, headers, URLs, or other means. Similarly, Java-based or similar applications may run under the same executable application, but with different command line parameters. These command line parameters may be used to identify processes or windows as members of the same or different groups, such that multiple dock or taskbar icons or elements can be created for the applications. Where applications are placed into additional groups, processes may be executed as necessary for creation of dock or taskbar icons or elements.

In some embodiments, either the process or the local client may comprise functionality for monitoring the state of the remote application or window generated by the remote application, and stopping execution of the process responsive to the remote application stopping or the window being closed. For example, responsive to a user quitting a remote application, the process corresponding to windows of that remote application may also quit.

At step 416, in some embodiments, the dock may be updated with the user interface element of the executing process. In many embodiments, this may be handled by the operating system, GUI or dock. For example, upon execution of a process, the dock may be configured to retrieve an icon of the executing process and place it within the dock. In many embodiments, the icon may be highlighted or otherwise marked to denote a currently executing application. This allows the dock to contain icons for both executing processes and non-currently executing processes, allowing the dock to simultaneously serve similar functions to an application-centric taskbar and a launch pad. Accordingly, in some embodiments, a user may place an icon of the process in the dock when the process is not running, or may direct the dock to keep the icon of the process in the dock when the process is not running. In many embodiments, the user may then interact with the process icon to initiate execution of the process. In a further embodiment, responsive to the user initiating execution of the process, the process may initiate execution of the local client and/or direct the local client to request execution or application output of a remote application corresponding to the process. For example, a user may place an icon for a process corresponding to a remote notepad application in the dock. When the user clicks on the icon to initiate execution of the process, the process may direct a local client to transmit a request to a remote computer to initiate execution of the remote notepad application. When the local client then receives application output and window configuration information from the remote notepad application, the local client may generate a window and modify the process to redirect user interaction to this window.

At step 418, in some embodiments, the process may redirect user interaction to the application output window using any of the techniques described above. In many embodiments, redirecting the user interaction may comprise bringing GUI focus to the application output window, responsive to the user bringing GUI focus to the process, as discussed above. In some embodiments, redirecting user interaction to an application output window may comprise redirecting user interaction to the local client, which may then bring a window generated by the local client to focus.

D. Systems and Methods for Providing Seamless Three-Dimensional Thumbnails

Many popular operating systems utilize static or dynamic thumbnails for providing intuitive interfaces to users. For example, as discussed above, a taskbar group of static and/or dynamic thumbnails may be displayed to a user responsive to the user clicking on or hovering over an icon representing one or more application windows or process windows. In another interface, responsive to a key command, three-dimensional static or dynamic thumbnails of open windows may be displayed allowing the user to "flip" through the thumbnails to select a window to bring to the foreground for interaction. An example of such an interface is the Flip3D interface provided as part of WINDOWS VISTA and WINDOWS 7, manufactured by the Microsoft Corp. of Redmond, Wash. In still another interface, two-dimensional thumbnails static or dynamic thumbnails may be displayed in an array or other configuration, allowing the user to select, via mouse, keyboard, or other input device, a window to bring to the foreground for interaction. An example of such an interface is the Expose interface provided as part of the MAC OS operating system, manufactured by Apple Inc., of Cupertino, Calif. In yet still another interface, an operating system may provide multiple virtual desktops to which windows can be assigned or moved, to reduce clutter and overlapping windows. One example of such an interface is the Spaces interface provided as part of some versions of the Apple MAC OS operating system. Other examples include virtual desktop interfaces provided by various window managers of the X Window System available with various versions of Unix, Linux, and similar operating systems. Other interfaces may include the Taskbar Preview interface provided in some versions of Windows, which displays a static or dynamic thumbnail preview of a window when a user moves a mouse cursor over a taskbar icon; and the Peek interface provided in some versions of Windows, which turns one or more windows transparent when a user moves a mouse cursor over a taskbar icon. For example, a display may show a first window, overlapping a second window, overlapping a third window. When the user moves a cursor over a taskbar associated with the third window, the interface may make the first and second windows transparent, allowing the user to view the contents of the third window without bringing the window to the foreground or focus for interaction.

As discussed above, many embodiments of thin-client computing or remote display presentation applications do not send visual data individually for each window on a remote system. Rather, many of these applications flatten images of overlapping windows on the remote system into a single image that can be sent to the client, resulting in reduced traffic and communications. This may result in unwanted effects if the client then attempts to generate static or dynamic thumbnails for these windows.

Figure 5A:
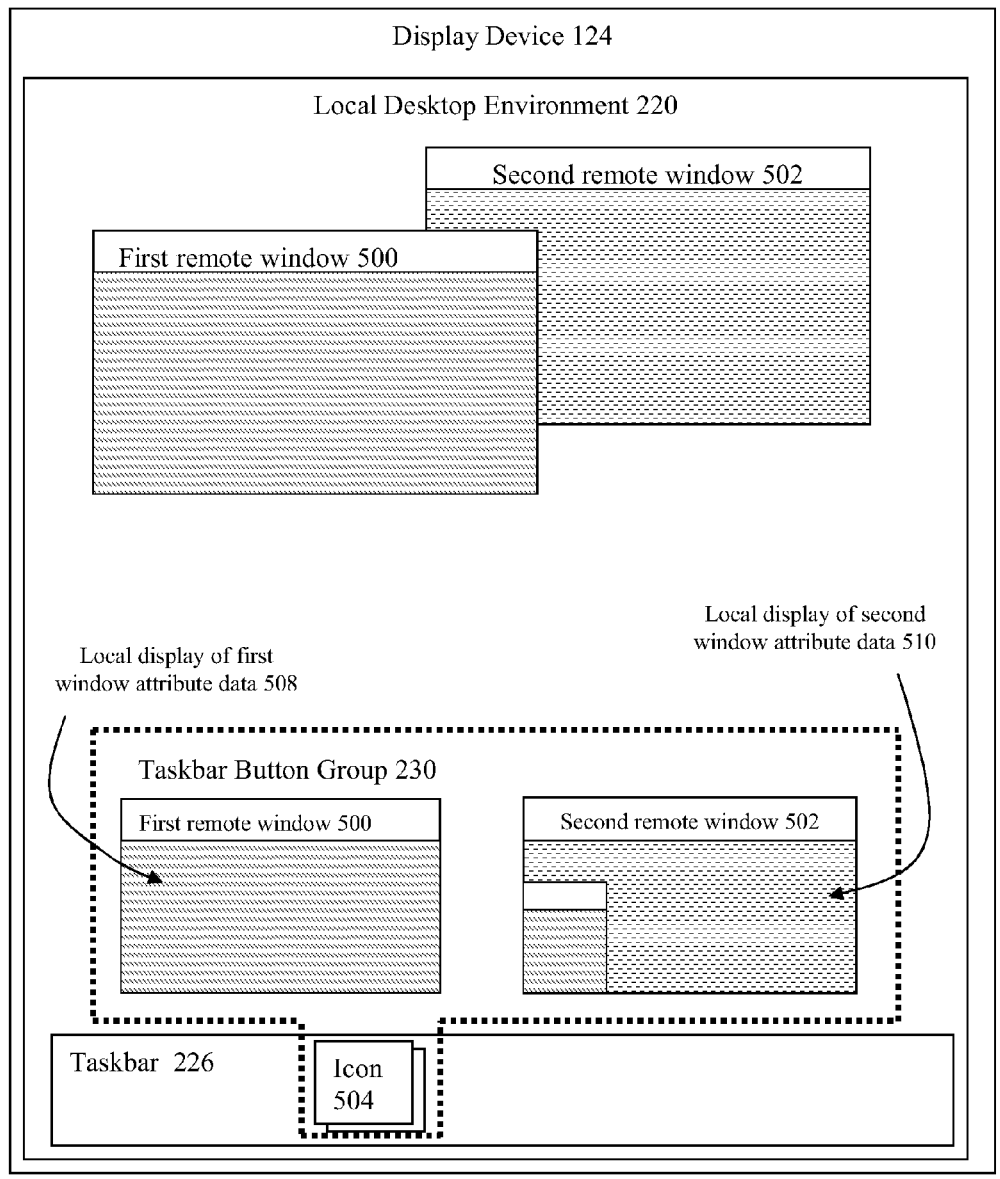
FIG. 5A is a block diagram of an embodiment of a display image on a client showing graphics corruption due to flattening display images on a server prior to being transmitted to the client.
Figure 5B:
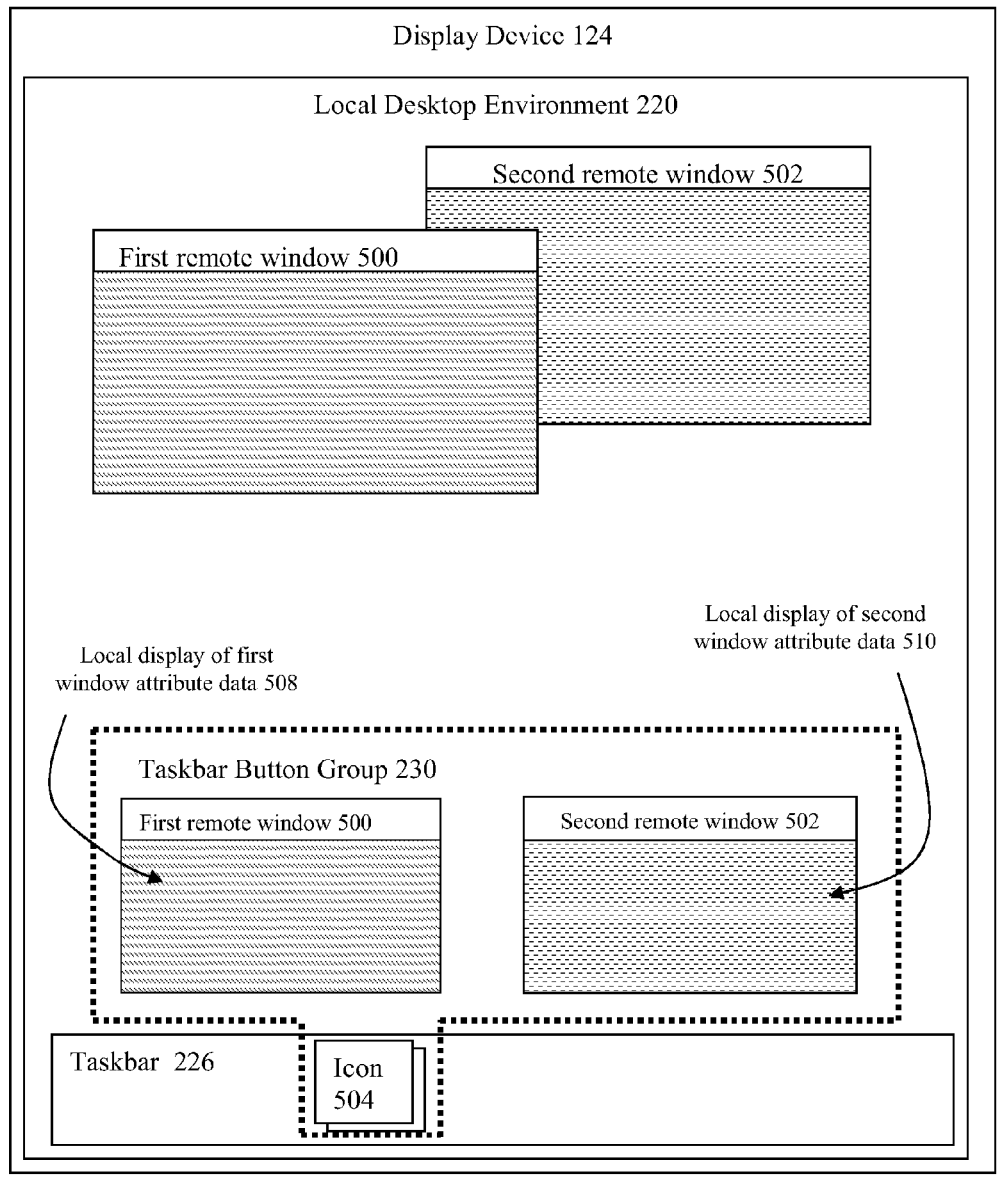
FIG. 5B is a block diagram of an embodiment of a display image on a client showing a lack of graphics corruption due to flattening display images on a server prior to being transmitted to the client.

For example, shown in FIG. 5A is a block diagram of an embodiment of a display image on a client showing graphics corruption due to flattening display images on a server prior to being transmitted to the client. As shown in this example, a local desktop environment 220 on a display device 124 of the client displays a first remote window 500 overlapping a second remote window 502. A window that is overlapped by another window, a taskbar, or an edge of the display may be generally referred to as clipped, or as a clipped window. As discussed above, user interaction with stacked icons 504 in a taskbar 226 may trigger display of a taskbar button group 230 with thumbnails of window attribute data from the each window. If the client creates the thumbnail by locating each first remote window within the local desktop environment 220 and taking a screenshot of the window data within that region, the thumbnail of the second remote window may include the overlapped image, resulting in an inaccurate and visually confusing thumbnail. Referring now to FIG. 5B for distinction, a block diagram of a display image is shown that lacks this graphics corruption in the displayed thumbnails. The graphics corruption shown in FIG. 5A may manifest in any of the interfaces discussed above. For example, in an interface providing multiple virtual desktops, such as MAC OS' Spaces, a user may place a first remote window 500 on one virtual desktop and a second remote window 502 on a second virtual desktop. These windows may not appear to be overlapping or clipped on the user's machine, as they are on different virtual desktops. However, on the server, the windows may still be overlapping on a single desktop or two-dimensional logical video buffer (LVB) and flattened prior to transmission to the client. Accordingly, when a user moves from one virtual desktop, where first remote window 500 is the foremost or active window, to a second virtual desktop with second remote window 502, second remote window 502 may include an overlapped portion of first remote window 500, leading to confusion.

Figure 5C:
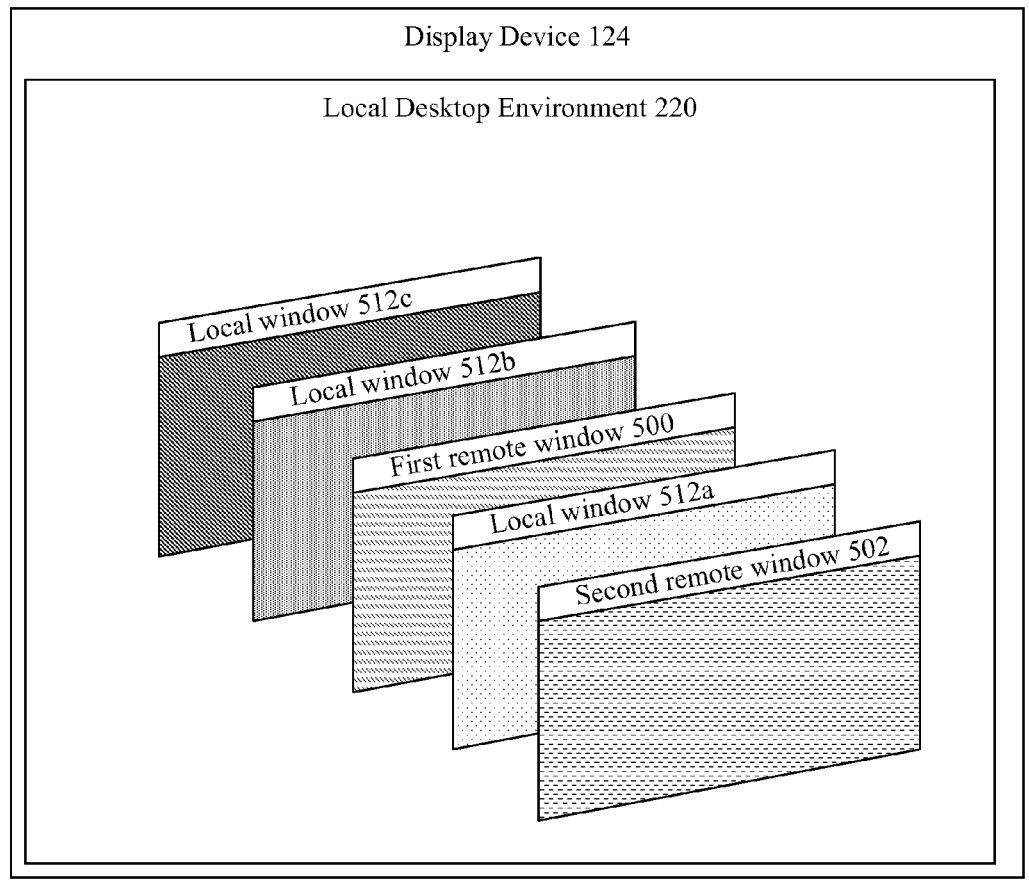
FIG. 5C is a block diagram of an example of a 3D interface for allowing a user to flip between thumbnails to select a program to bring to the foreground.

Referring briefly to FIG. 5C, shown is a block diagram of an example of a 3D interface for allowing a user to flip between thumbnails to select a program to bring to the foreground. As shown, one or more window thumbnails, including local windows 512a-c and remote windows 500 and 502 may be displayed. Responsive to user interactions, a frontmost thumbnail image may be "flipped" to the back of the stack, or a rearmost thumbnail image may be "flipped" to the front of the stack. As shown, without the thumbnail graphics corruption shown in FIG. 5A, a user can see all of second remote window 502.

One method of avoiding the thumbnail corruption shown in FIG. 5A is to not use thumbnails for remote applications, but to simply use icons representative of the remote application window, such as an icon representing a notepad or a web browser application. However, a user will not experience a seamless interface when these icons are viewed next to client-rendered static or dynamic thumbnails of local applications, as it will be obvious which applications are local and which are remote. Another method is to continuously send individual images for each window from the server, but this may consume large amounts of bandwidth and be unnecessary for static images that don't change. Bandwidth requirements may be reduced by sending the images at lower rates, but this may degrade the user experience as window images are not updated to reflect their proper contents. Alternately, individual images may be sent for a foreground or active window at a high rate and background windows at a lower rate, on the assumption that windows the user is not interacting with change less frequently. However, this assumption may not always be correct. Background windows may include dynamic content that is updated responsive to events other than user interaction, such as email applications that are updated as new emails arrive, web browser windows with dynamic content, multimedia content such as a video player, or even a simple clock that changes its display over time.

To avoid thumbnail corruption without the additional difficulties discussed above, in one embodiment of a method of providing seamless three-dimensional thumbnails, a client may identify one or more windows that are clipped by another window, a taskbar, or a display edge. This is because the window manager of the client may be able to properly generate and display preview images and thumbnails for unclipped or non-overlapped windows. The client may notify the host that a remote application window is clipped and request non-corrupted images of the clipped window during previews. To reduce bandwidth requirements, the host may transmit images only when the size, position, or contents of the window being previewed have changed, as static images need not be retransmitted. Furthermore, differential images, or differences between a new snapshot of a window and a prior snapshot of the window, may be transmitted which may drastically reduce bandwidth requirements where only a small portion of the window changes from one instant to another. The client may also cache prior preview images to be able to use these differential images to recreate the new snapshot. Additionally, the images may be compressed prior to transmission. Preview images may be cached by the client even after preview has ended, such that the client may show the cached preview image the next time preview is activated while waiting for a new snapshot from the host.

Figure 6A:
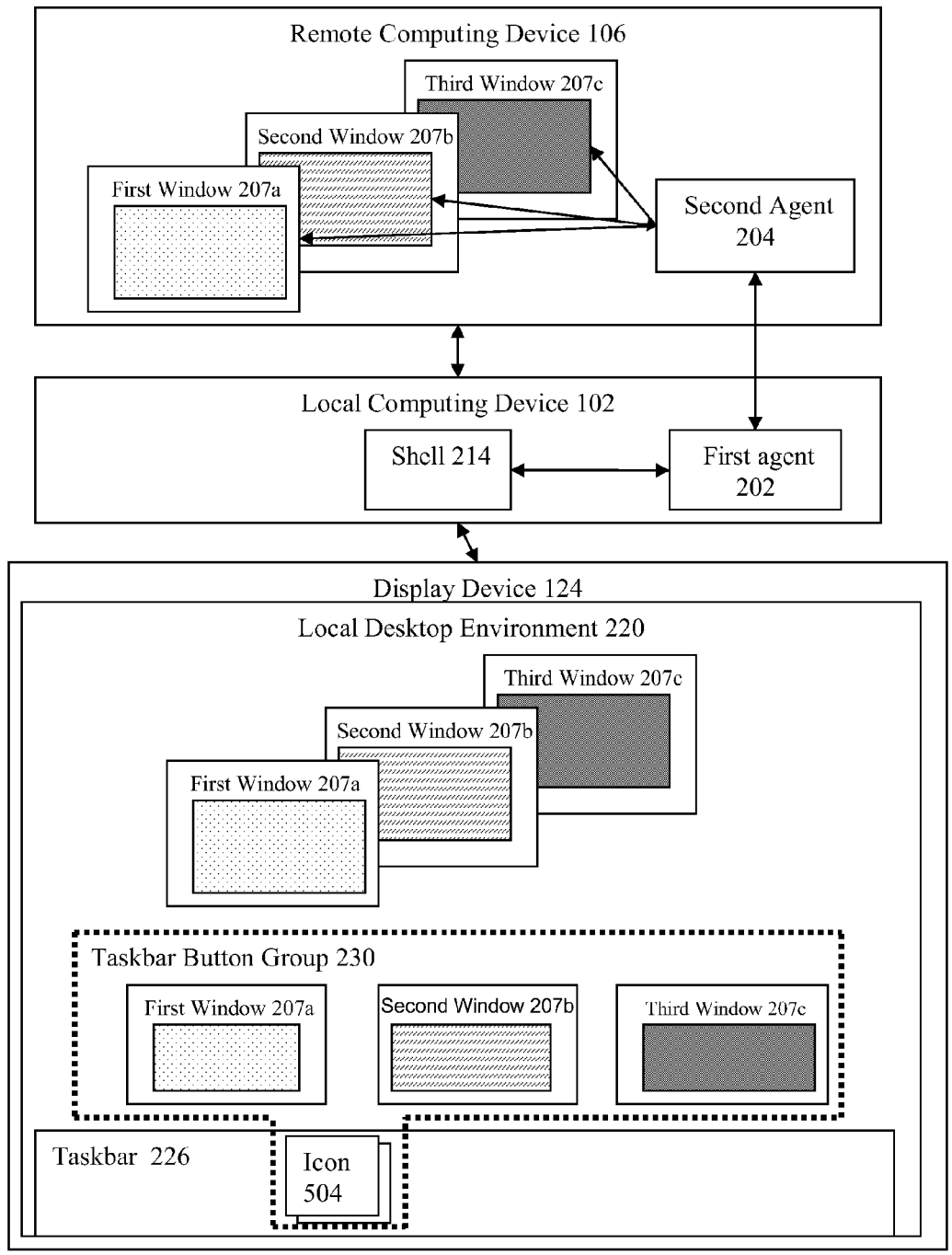
FIG. 6A is a block diagram of an embodiment of a system for providing seamless three-dimensional thumbnails.

Shown in FIG. 6A is a block diagram of an embodiment of a system for providing seamless three-dimensional thumbnails. Briefly, the system includes a first agent 202 executing on a local computing device 102, a second agent 204 executing on a remote computing device 106, and one or more windows 207a-207c (referred to generally as windows 207 or remote windows 207) generated by one or more applications or processes (not illustrated) on remote computing device 106. As discussed above, the first agent 202 receives, from the second agent 204, an identification of first window 207a, second window 207b, and third window 207c. Although windows 207a-207c are shown as associated, using the techniques described above in connection with FIGS. 2-4, in some embodiments, the windows may be unassociated with each other, or one or more windows may be associated with each other while one or more other windows are unassociated. A shell 214 executing on the local machine 102 displays image data representative of windows 207a-207c in a local desktop environment 220 on a display device 124. The shell 214 also displays, in a taskbar button group 230, an identification of each of the windows 207a-207c. Although windows 207a-207c are shown as associated, using the techniques described above in connection with FIGS. 2-4, in some embodiments, the windows may be unassociated with each other, or one or more windows may be associated with each other while one or more other windows are unassociated. For example, windows 207a and 207b may be associated in a taskbar button group 230, while window 207c is not associated with windows 207a or 207b. Accordingly, a thumbnail of window 207c would not be shown in the taskbar button group. Furthermore, although not illustrated, additional windows generated by applications or processes executing on local computing device 102 may overlap one or more of remote windows 207, and may be associated with one or more of remote windows 207 in one or more taskbar button groups 230, using any of the techniques described above.

Still referring to FIG. 6A and in more detail, in some embodiments, a second agent 204 executing on remote computing device 106 may receive a request to send window previews to a local computing device 102. In some embodiments, second agent 204 may receive the request from a first agent 202 or other application or process executing on the local computing device 102. In other embodiments, second agent 204 may receive the request responsive to the expiration of a timer monitored by second agent 204. For example, second agent 204 may monitor a timer to periodically, on expiration of the timer, send window previews to local computing device 102. In a further embodiment, second agent 204 may not receive an explicit request, but rather a request may be implied by expiration of the timer. In another embodiment, second agent 204 may initiate sending window previews to a local computing device 102 responsive to other triggers, such as opening a connection to local computing device 102, an application or process on remote computing device 106 generating a new window 207, expiration of an external timer, a manual command from a user or administrator or remote user or remote administrator, or any other command or signal to indicate window previews are desired.

In some embodiments, responsive to a request, second agent 204 may initiate capturing of image previews of one or more windows 207a-207c. In one embodiment, second agent 204 may use an API provided by the operating system to take a snapshot of one or more application windows 207a-207c, such as a PrintWindow API or other interface. In some embodiments, second agent 204 may identify a window for capturing of a snapshot via a window handle, while in other embodiments, second agent 204 may identify a window via window coordinates. In still other embodiments, second agent 204 may identify a window for capturing of a snapshot via a parent-child relationship to another window. In some embodiments, second agent 204 may take further snapshots of the window. This may be done responsive to the expiration of a timer, responsive to the window changing size or position, responsive to the contents of the window being changed, responsive to a z-order of the window being changed, or a combination of any of these triggers. In many embodiments, one or more prior snapshots may be cached by second agent 204.

In some embodiments, second agent 204 may compare the snapshot of a window to a prior cached snapshot to detect differences between the snapshots and create a differential image. In one embodiment, second agent 204 may perform an XOR operation of the present snapshot and a prior snapshot or a similar operation to create a differential image representing the difference between the present snapshot and the prior snapshot. This differential image may be significantly smaller than the snapshot, particularly in instances where a user interface of a window does not change even though the contents may. In many embodiments, second agent 204 may periodically transmit full snapshots rather than differential images. This may be done to ensure that any corruption caused by errors in the transmission or differential images do not persist. In some embodiments, second agent 204 may transmit full snapshots responsive to one or more of: expiration of a timer; a counter, reset on transmission of a full image and incremented for each transmitted differential image, reaching a predetermined value; a window being resized; a window being moved or having its z-order modified; or any other factor. In some embodiments, second agent 204 may flag images as differential or non-differential images accordingly.

In some embodiments, second agent 204 may transmit the stored screen captures for each window to a first agent 202 on a local computing device 102. In one embodiment, second agent 204 may transmit the stored images using a virtual channel on an established communication link, such as an ICA virtual channel. In some embodiments, second agent 204 may transmit each screen capture as it is taken or stored, while in other embodiments, second agent 204 may transmit the screen captures together. In many embodiments, the screen captures may be reduced in size or resolution prior to transmittal. For example, in some embodiments, the maximum size for a thumbnail may be predefined by the operating system or resolution of local computing device 102. Accordingly, each screen capture may be reduced to this size or resolution prior to transmittal to reduce bandwidth requirements. In some embodiments, each screen capture or set of screen captures may be compressed prior to transmittal. For example, in many embodiments, second agent 204 may compress images prior to transmission, using any compression algorithm, such as run-length encoding (RLE), JPEG, or PNG compression.

In some embodiments, upon receipt of each screen capture, first agent 202 may decompress the image, if necessary. First agent 202 may pass each screen capture to a shell 214 to be used as a thumbnail for 3D flip interfaces, 2D thumbnail interfaces, taskbar button groups, or other user interfaces, using APIs provided by the shell 214 or operating system of the local computing device 102. In some embodiments of these interfaces, the operating system or shell may provide an ability for applications or processes to provide images for use as thumbnails. For example, many interfaces allow an application to provide an icon or other image to use as a thumbnail, rather than allowing the client operating system to take a screen shot of an active window. By providing the received images for use as thumbnails, a seamless user experience may be obtained. In some versions of the Microsoft Windows operating system using the Desktop Window Manager, for example Windows 7 and Windows Vista, first agent 202 may set a window attribute of DWMWA_HAS_ICONIC_BITMAP to TRUE using the DwmSetWindowAtribute API. This will indicate to the window manager that the first agent 202 is responsible for providing an icon or image for thumbnails or preview images.

In some embodiments, the screen capture or preview image received by first agent 202 may be of sufficient size and/or resolution to utilize as the primary image for the window. Accordingly, in a further embodiment, the first agent 202 may use these received preview images for both thumbnail previews and for local display of windows in the local desktop environment. First agent 202 may thus replace the clipped image in the window with the received unclipped image, and indicate to a window manager or shell, such as the Windows Desktop Manager, to generate live previews based off the local display of the remote window. For example, first agent 202 may set a window attribute of DWMWA_HAS_ICONIC_BITMAP to FALSE using the DwmSetWindowAtribute API. This may be done to reduce complexity at the client, which will not have to retrieve a thumbnail icon for display.

Figure 6B:
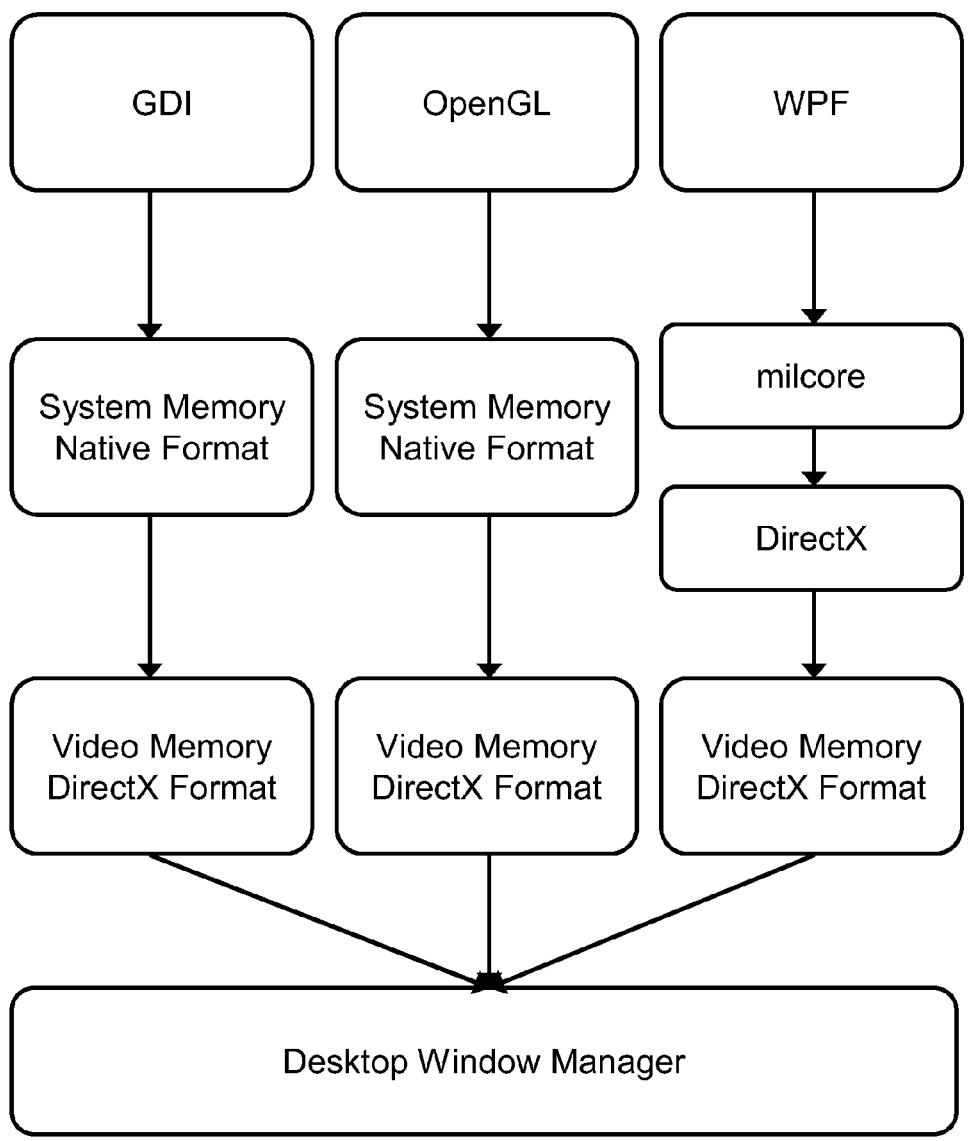
FIG. 6B is a block diagram of an embodiment of a system for providing seamless three-dimensional thumbnails regardless of remote application type.

Referring briefly to FIG. 6B, shown is a block diagram of a system for providing seamless three-dimensional thumbnails regardless of remote application type. Applications may use different APIs or graphics subsystems for displaying graphics, such as the Graphics Device Interface (GDI), the Open Graphics Library (OpenGL), or the Windows Presentation Foundation (WPF), among others. Many newer interfaces such as WPF allow applications to render graphics to an off-screen surface or memory buffer. A compositing window manager, such as the Microsoft Windows Desktop Window Manager (DWM) then composites each application's buffer into a final image for display. This is distinct from older interfaces which used a stacking window manager in which each program wrote to the main buffer. While DWM-aware interfaces such as WPF use a DWM-compatible format such as DirextX, to maintain compatibility with older DWM-agnostic applications using GDI or OpenGL or similar interfaces, dedicated buffers may be designated for each application. These application may render in a native format, such as bitmaps, and then these buffer contents may be converted to a DWM-compatible format such as DirectX.

As shown, unclipped application images from each application are in a DWM-compatible format prior to compositing, regardless of remote application type or graphics subsystem used. Accordingly, by retrieving these image bitmaps and window information from the video memory prior to compositing, unclipped window contents, dynamically updated by the application generating the window, may be accessed by another application or user interface element. This technique is used for collecting live thumbnail previews of local applications for the Windows Flip3D and Peek interfaces, for example. However, it may be also used with remote applications using the systems and methods discussed herein. In embodiments using the Microsoft Windows Desktop Window Manager, an API such as the DwmpDxGetWindowsSharedSurface method of the DWM may be used to retrieve the unclipped window contents as a texture. This texture may then be transmitted to the local client to provide unclipped, dynamic thumbnails or window displays, as discussed above.

Figure 6C:
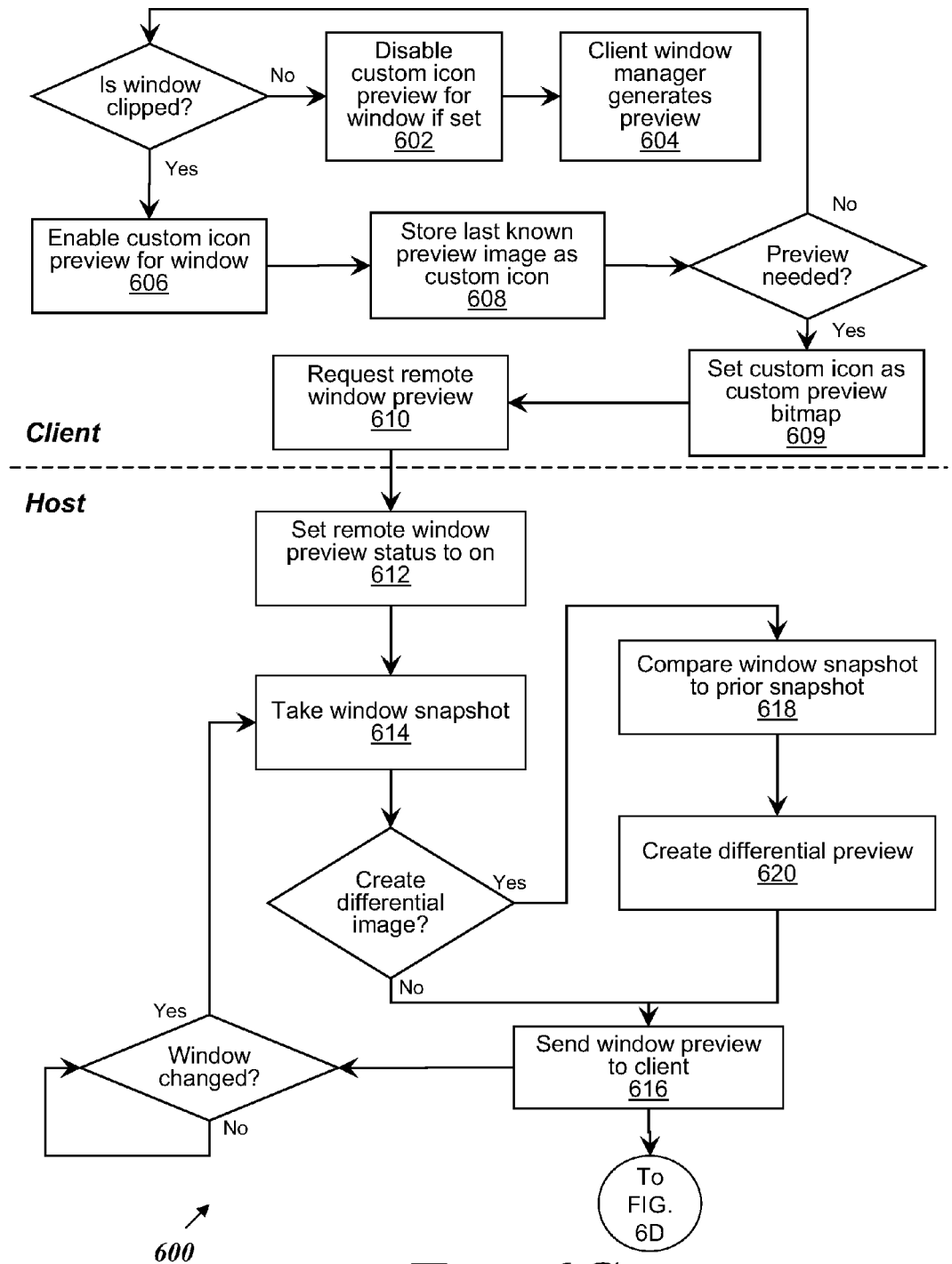
FIGS. 6C-6D are a flow chart of an embodiment of a method for providing seamless three-dimensional thumbnails.
Figure 6D:
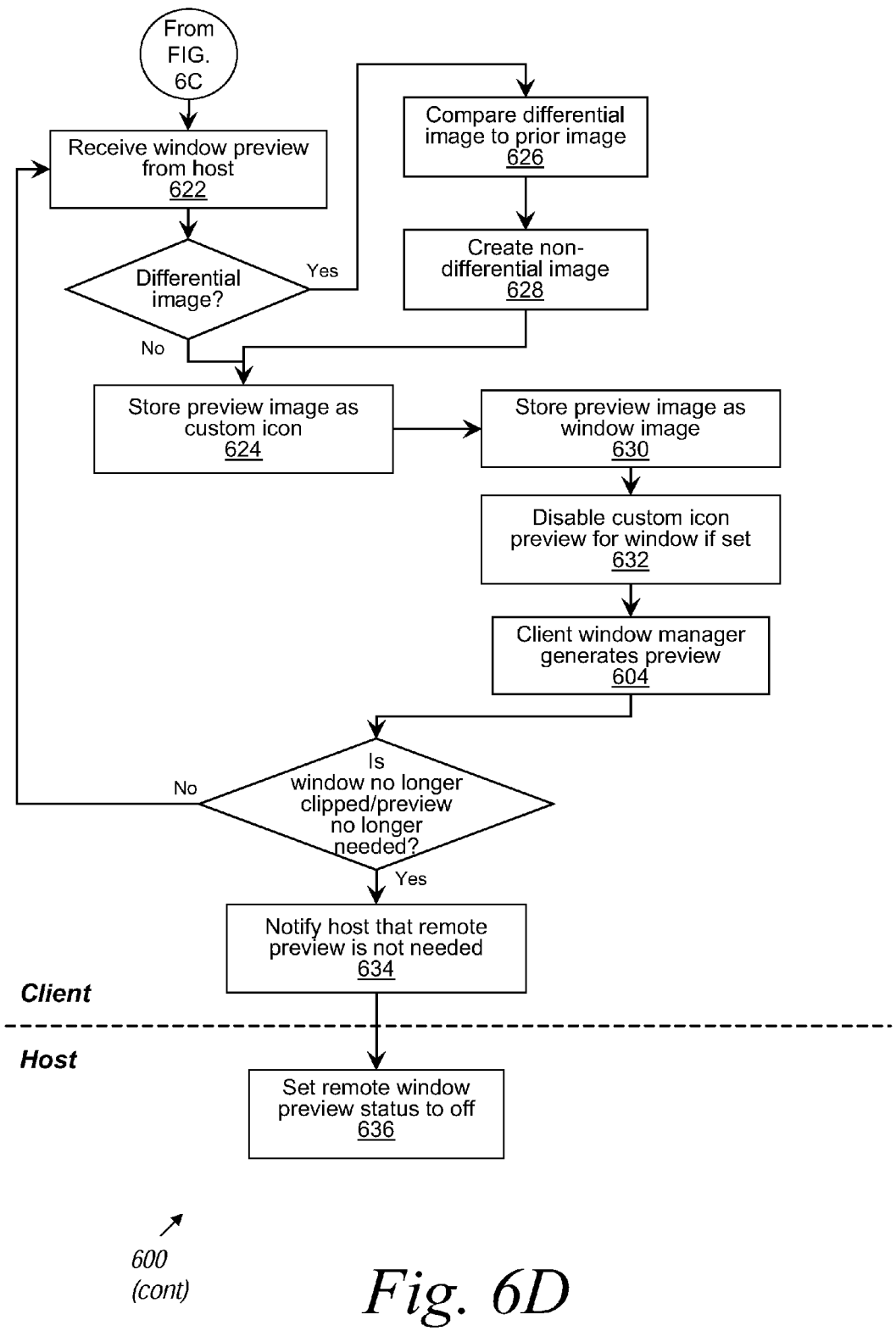

Referring now to FIGS. 6C and 6D, shown are a flow chart of an embodiment of a method 600 for providing seamless three-dimensional thumbnails for hosted applications. As shown, some steps of the embodiment method depicted are performed by a client and other steps are performed by a host. As discussed above, a host may refer to any computing device executing an application or applications for remote display on a client. Furthermore, although referred to as host and client, in some embodiments, a client may also be a host and provide remote display of one or more windows to a second client. This may be done, for example, for remote monitoring of user applications on one or more clients by an administrator. In a similar embodiment, a client may transmit graphical output data of a client-hosted application to a server to allow the client-hosted application to be seamlessly integrated into a remote desktop.

In brief overview, a client agent may determine if a local display of a remote application window is clipped by another remote window, interface element such as a taskbar, or an edge of the display. If not, then the window contents may be used for generating live previews. Accordingly, at step 602, the client agent may disable a custom icon preview setting for the window, if one is set, and at step 604, a window manager on the client may generate window previews as needed. If the window is clipped, at step 606, the client agent may enable custom icon preview for the window. At step 608, the client agent may store the last known preview image as a custom icon for the window. Steps 602-608 may be repeated until previews are needed. When previews are needed, at step 609, the client agent may set the last known preview image as a custom preview bitmap. The client agent may transmit a request to a host for remote previews of the window at step 610.

At step 612, responsive to receiving the request, a host agent may set a remote window preview status of the window to on. At step 614, the host agent may take a snapshot of the window. As discussed above, in the case of a first snapshot where no differential comparison may be made, or periodically to avoid errors and corruption, or when the window is resized, the host agent may transmit the full snapshot as a window preview to the client at step 616. Alternately, the host agent may compare the window snapshot to a prior snapshot at step 618 and may create a differential preview at step 620, which may be transmitted to the client at step 616. Steps 614-620 may be repeated periodically, or whenever the window has changed position, size, z-order, or when the contents of the window have changed.

At step 622, the client agent may receive the window preview from the host agent. If the image is not a differential image, then at step 624, the client agent may store the preview image as a custom icon. Alternately, if the image is a differential image, then the client agent may compare the differential image to a prior stored image at step 626 and create a non-differential image at step 628. At step 630, because the preview image may represent an unclipped image of the full contents of the window, in some embodiments, the preview image may be stored as the window image. At step 632, the client agent may disable custom icon preview for the window if set, allowing a compositing window manager on the client to generate live previews 604 (as shown in FIG. 6C) of the image stored as the window image at step 630. This may be done to reduce complexity on the client, as discussed above. If the window is still clipped and if previews are still needed, then one or more of steps 622-632 may be repeated for each new window preview received from the host agent. In some embodiments, for example, step 632 may be skipped after the first time custom icon previews for the window have been disabled.

Once previews are no longer needed or the window is no longer clipped (such that the local compositing window manager may easily create unclipped window previews), at step 634, the local agent may notify the host that remote preview is no longer needed. At step 636, responsive to this notification, the host agent may set remote window preview status for the window to off. Although shown in reference to a single window, in embodiments with multiple hosted windows, the steps herein may be performed in parallel or serially for multiple windows.

Still referring to FIGS. 6C and 6D and in more depth, in some embodiments, a client agent may monitor the positions of windows displaying remote content from an application executing on a remote computing device, or hosted windows, to determine if the windows are clipped by another remote window, a user interface element such as a taskbar, or an edge of the display. In some embodiments, the client agent may determine if the window is clipped by an edge of a two-dimensional logical video buffer (LVB) used for rendering by the application, as discussed above. If the window is not clipped, then the display contents of a live preview generated from the LVB by a window manager will not be corrupted. Accordingly, at step 602, the client agent may disable custom icon preview for the window, if set. In one embodiment using the Windows Desktop Window Manager (DWM), this may be done by setting a window attribute of DWMWA_HASJCONIC_BITMAP to FALSE using the DwmSetWindowAttribute method. At step 604, the client window manager may then generate live previews of the window as needed, such as on activation of a thumbnail preview, 3DFlip, Peek, or other interface.

If the window is clipped, then in some embodiments, at step 606, the client agent may enable custom icon preview for the window. In one embodiment using the Windows Desktop Window Manager (DWM), this may be done by setting a window attribute of DWMWA_HAS_ICON-IC_BITMAP to TRUE using the DwmSetWindowAttribute method.

At step 608, in some embodiments, the client agent may store or initialize the last known preview image for the window as a custom icon. In other embodiments in which the client agent does not have a last known preview image for the window, such as on the first execution of method 600, the client agent may use an alternate image, such as an icon associated with the application. This may be displayed during preview for the time period until the client receives a preview image from the host for the window, ideally just a short time period.

In some embodiments, the client agent may continue monitoring the position of the window and repeat steps 602-608. This may be done to ensure that clipped and unclipped windows are treated properly when the user executes an interface requiring a preview image. Said monitoring may be performed periodically, or responsive to changes in the position, size, z-order, or contents of the window. The client agent may also monitor the desktop window manager to detect when a preview of a certain type has begun. For example, when a window thumbnail is requested for taskbar previews, the Windows DWM may send a message to the window of WM_DWMSENDI-CONICTHUMBNAIL. Similarly, when a window preview is requested for elements such as Peek, the Windows DWM may send a message to the window of WM_DWMSENDI-CONICLIVEPREVIEWBITMAP. In some embodiments, at step 609, the client agent may respond to these notifications with the custom icon, via a corresponding DwmSefi-conicThumbnail or DwmSeticonicLivePreviewBitmap message. This allows the custom icon, comprising either the last known image or an alternate image, to be shown during the period before a preview image arrives from the host. In other embodiments, the client may request the preview image from the host prior to the window being previewed, but this may require extra bandwidth and CPU utilization and increase inefficiency, in exchange for only a slight gain in the responsiveness of previews.

At step 610, the client agent may request a remote window preview from the host for the window. In some embodiments, this request may include a HostID of the requested window in order to uniquely identify it. In other embodiments, this request may include a window handle, a position of the window, a parent window of the window, or other information to uniquely identify the requested window. The request may include one or more flags set to request remote previews of the identified windows. In some embodiments, the request may be transmitted over a virtual channel. For example, the request may be transmitted over the ICA Seamless or Control virtual channels.

At step 612, responsive to receiving the request, the host agent may set a preview status of the window identified in the request to on. This may be done, for example, by setting a window attribute or flag of the window to a predetermined value or by using internal bookkeeping by the host agent.

At step 614, the host agent may take a snapshot of the window. In some embodiments, this may be done by retrieving the contents of a memory buffer, as discussed above. For example, commands by a compositing desktop window manager on the host, such as a CreateTexture command, may be hooked or intercepted to retrieve textures from individual application windows. In another example, functions of the window manager may be called to retrieve said textures, such as the DwmpDxGetWindowSharedSurface function discussed above. In many embodiments, the window snapshot may be taken using a PrintWindow API or a similar function or API. In some embodiments, taking a snapshot of the window may comprise storing a current snapshot as a previous snapshot and then replacing the current snapshot with a new snapshot. This may be done, for example, to allow for the creation of differential images. In other embodiments, the current snapshot may be performed as a previous snapshot at other times, such as after steps 618 or 620, for example.

At step 618, in some embodiments, the host agent may compare the snapshot to a previously taken snapshot. In one embodiment, the host agent may perform an XOR against a previously taken snapshot to create a differential image. In some embodiments, such as where the host agent has no prior image, the host agent may use a black image as the prior snapshot. This may be done to reduce complexity. The result of the comparison or XOR operation may be stored as a differential preview image at step 620.

In some embodiments, at step 616, the host agent may transmit a preview image to the client. In one embodiment, the preview image comprises the snapshot taken at step 614, while in other embodiments, the preview image may comprise the differential image created at step 620. In some embodiments, full preview images may be sent periodically to reduce corruption or errors, when the window is resized, on the first image, or under other circumstances. In some embodiments, the host agent may set a flag or attribute in the preview image to indicate whether the preview image is a differential image or a full preview image. In one embodiment, the host agent may set the flag to indicate that a first preview image is not a differential image, and may set the flags of successive images to indicate that they contain differences from the initial preview image. In some embodiments, prior to transmission, the host agent may serialize the image into a device-independent bitmap image. In another embodiment, prior to transmission, the host agent may compress the image, using RLE, JPG, PNG, or other compression algorithms. This may be done to reduce the bandwidth required for transmission. In many embodiments, because thumbnail previews may be presented to the user in a significantly reduced size from the original image in various interfaces, a high level of lossy compression may be applied without apparent distortion. In other embodiments, the image may be scaled prior to, after, or instead of compression to reduce bandwidth requirements. Similarly, in yet other embodiments, a color depth of the image may be reduced. In some embodiments, the image may be sent via a virtual channel to the client agent.

In many embodiments, steps 614-620 may be repeated periodically as the window changes. For example, in one embodiment, the host agent may use an API such as the Active Accessibility API provided by Microsoft to determine when the size or position of the window changes, and may repeat steps 614-620 accordingly. In another embodiment, the host agent may periodically poll the window, such as once per second or other intervals, to determine if the window's contents have changed, and may be repeat steps 614-620 accordingly.

At step 622, the client agent may receive the image from the host agent. In one embodiment, the client agent may receive the image via a virtual channel to the host agent. In some embodiments in which the client agent receives a compressed image from the host agent as discussed above at step 616, the client agent may decompress the image or convert a compressed image to an uncompressed bitmap.

In some embodiments, the client agent may determine via a flag, attribute, or bit set in the image to determine whether the image is a differential image. If the received image is not a differential image, then at step 624, the client agent may replace a last known preview image for the window with the received image. In some embodiments, replacing the last known preview image may comprise replacing a custom icon image, while in other embodiments, the last known preview image may be stored separate from a custom icon image.

If the received image is a differential image, then at step 626, the client agent may compare the received image to a last known preview image stored or cached on the client. In one embodiment, the client agent may perform an XOR operation of the received image to the last known preview image to produce a full non-differential image at step 628. As shown, at step 624, the client agent may then replace the last known preview image for the window.

In some embodiments, because the preview image may comprise the full contents of the remote window, free of clipped regions, the client agent may store the preview image as the window image at 630. In a further embodiment, the client agent may disable updates to the window via the method discussed above in connection with FIG. 2. This may reduce bandwidth requirements, as the preview image includes all of the application output data plus any clipped regions, and the ordinary updates to the application output data are thus superfluous. In some embodiments, the client agent may reenable updates to the window once the window is no longer clipped or preview is no longer needed, in combination with step 634 below.

In some embodiments, step 630 may further comprise disabling external window clipping for local child windows of the window generated for acceleration features. In many embodiments, the contents of various graphics acceleration features such as Remote Audio & Video Extensions (RAVE), Flash or Windows Media video, or others, may be rendered at the client as child windows on top of the parent remote window. For example, rather than decoding a multimedia file in a streamed format at the host, encoding the resulting images in a presentation protocol such as ICA, transmitting the images to the client and displaying them in an application output window, which may result in heavy bandwidth use, buffering problems and a poor fidelity user experience, in some embodiments, streaming video or mixed audio and video data may be transmitted in native format to the client from the host and decoded and rendered by the client in a child window on top of the parent remote window. This may reduce processing load on the host and gain efficiencies in transmission of the streaming protocol. Internal clipping may occur over the child window, for example, when a user activates a pull-down menu in the parent remote media player that should display on top of the child window. This is distinct from external clipping, such as when another window in the host session overlays the application window. External clipping of the child windows may be disabled, to prevent the child window, such as a video, from being improperly clipped when displayed as part of the preview image of the parent application window, such as a media player application window. In some embodiments, internal clipping may also be disabled for simplicity, due to the fact that it is unlikely that a user would be activating a menu of the parent application during preview.

At step 632, in some embodiments, the client agent may disable custom icon previews for the window, or enable the client desktop window manager to generate live previews for the window. This may be done, for example, by setting a window attribute of DWMWA_HAS_ICONIC_BITMAP to FALSE using the DwmSetWindowAttribute method. As discussed at steps 602-604, because the window no longer includes a clipped region, the desktop window manager may generate live previews for the window without including clipping or graphics corruption. By disabling custom icon previews, the complexity of operations by the client may be reduced, particularly with mixed parent/child windows as discussed above with accelerated graphics features, where the client would otherwise have to act as a complex window manager and generate custom previews that include a combination of client-rendered contents of the child window and custom icons or thumbnails sent from the host.

In some embodiments, one or more of steps 622-632 may be repeated for successive window previews received from the host agent. At step 634, once the client agent detects that the window is no longer clipped, or that preview is no longer needed, in some embodiments, the client notifies the host that remote preview is not needed. In some embodiments, the client may detect if the window is clipped by monitoring the size, position, or z-order of the window for changes and detecting whether the window is clipped, responsive to this change. In other embodiments, the client may detect that preview is no longer needed by observing that a taskbar or other element closes or terminates a window with a class name indicating the preview was generated, such as "TaskListThumbnailWnd", "TaskSwitcherWnd", "Flip3D", or similar name. The client agent may notify the host that remote preview is no longer needed via a control command and may include a HostID, window handle, a position of the window, a parent window of the window, or other information to uniquely identify the requested window, as at step 610. The notification may include one or more flags set to not request remote previews of the identified windows. In some embodiments, the notification may be transmitted over a virtual channel. For example, the notification may be transmitted over the ICA Seamless or Control virtual channels. In some embodiments, the client agent may enable updates to the window using the method discussed above in connection with FIG. 2, and may enable window clipping, as discussed above in at step 630.

At step 636, responsive to receiving the notification from the client agent, the host agent may set a preview status of the window identified in the request to off. This may be done, for example, by setting a window attribute or flag of the window to a predetermined value or by using internal bookkeeping by the host agent.

In many embodiments, method 600 may be repeated for successive previews, and may be performed in parallel or iteratively for multiple hosted windows. Method 600 may thus be used to provide unclipped windows from hosted applications to an operating system or shell of a client for use in various user interfaces, providing a seamless experience in which remotely executing applications appear substantially indistinguishable from locally executing applications in these user interfaces.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing seamless thumbnails for hosted applications, it will now become apparent to one of skill in the art that other embodiments incorporating the concepts of the invention may be used.

What is claimed:

1. A method of updating a taskbar, generated and displayed by a local computer, with a user interface element representative of a remote application executing on a remote computer and application output generated by the remote application, the method comprising:
    receiving, by a local client executing on a local machine, application output generated by a remote application executing on a remote computer, the user interface element representative of the remote application, and remote window configuration information;
    generating, by the local client responsive to receiving the remote window configuration information, an application output window for displaying the received application output, the application output window comprising local taskbar grouping configuration information; wherein generating comprises:
    determining, by the local client responsive to a presence of an explicit taskbar grouping flag in the remote window configuration information, one of a process identifier, window identifier, or application identifier, identifying the remote application in the remote window configuration information;
    generating an application output window with the local taskbar grouping configuration information comprising the determined process identifier, window identifier, or application identifier; and
    updating a taskbar responsive to the local taskbar grouping configuration information, with the user interface element.

2. The method of claim 1, wherein generating an application output window comprising local taskbar grouping information comprises:
    determining, by the local client responsive to an absence of an explicit taskbar grouping flag in the remote window configuration information, a file system path of the remote application;
    replacing, by the local client, a portion of the file system path of the remote application with an identifier of a local file system path to create a hybrid file system path; and
    generating, by the local client, an application output window with local taskbar grouping configuration information comprising the hybrid file system path.

3. The method of claim 2, further comprising:
    identifying, by the local client, a presence of an existing taskbar button group corresponding to the hybrid file system path; and
    moving, by the local client, a taskbar button corresponding to the generated application output window to the existing taskbar button group, the taskbar button generated by an operating system of the local machine responsive to generation of the application output window.

4. The method of claim 2, further comprising:
    identifying, by the local client, an absence of an existing taskbar button group corresponding to the hybrid file system path;
    generating, by the local client, a taskbar button group corresponding to the hybrid file system path; and
    moving, by the local client, a taskbar button corresponding to the generated application output window to the generated taskbar button group, the taskbar button generated by an operating system of the local machine responsive to generation of the application output window.

5. The method of claim 1, further comprising:
    storing, by the local client, the received user interface element with an identification corresponding to the generated application output window; and
    displaying, responsive to user interaction with a taskbar button, the received user interface element.

6. The method of claim 5, wherein the received user interface element comprises a thumbnail image of the application output.

7. The method of claim 5, wherein the received user interface element comprises a window title generated by or icon of the remote application.

8. The method of claim 1, further comprising displaying, by an operating system of the local machine, responsive to user interaction with a taskbar button, a thumbnail image of the application output, the thumbnail image generated by the operating system.

9. The method of claim 1, further comprising displaying, responsive to user interaction with a taskbar button generated responsive to generation of the application output window, a window title of the generated application output window, the window title generated by the local client.

10. A system for updating a taskbar, generated and displayed by a local computer comprising a processor, with a user interface element representative of a remote application executing on a remote computer and application output generated by the remote application, the system comprising a local machine, executing:
    a local client executing on the processor of the local machine to cause the processor to:

receive application output generated by a remote application executing on a remote computer, the user interface element representative of the remote application, and remote window configuration information, generate, responsive to the received remote window configuration information, an application output window for displaying the received application output, the application output window comprising local taskbar grouping configuration information generated based on the remote window configuration information;

wherein to generate, the local client executes on the processor of the local machine to cause the processor to:

determine, responsive to a presence of an explicit taskbar grouping flag in the remote window configuration information, one of a process identifier, window identifier, or application identifier, identifying the remote application in the remote window configuration information, generate an application output window with the local taskbar grouping configuration information comprising the identified process identifier, window identifier, or application identifier, and instruct an operating system to update a taskbar, responsive to the local taskbar grouping configuration information, with the user interface element.

11. The system of claim 10, wherein the local client is further configured to:

determine, responsive to an absence of an explicit taskbar grouping flag in the remote window configuration information, a file system path of the remote application, replace a portion of the file system path of the remote application with an identifier of a local file system path to create a hybrid file system path, and generate an application output window with local taskbar grouping configuration information comprising the hybrid file system path.

12. The system of claim 11, wherein the local client is further configured to:

identify a presence of an existing taskbar button group corresponding to the hybrid file system path, and move a taskbar button corresponding to the generated application output window to the existing taskbar button group, the taskbar button generated by the operating system responsive to generation of the application output window.

13. The system of claim 11, wherein the local client is further configured to:

identify an absence of an existing taskbar button group corresponding to the hybrid file system path, generate a taskbar button group corresponding to the hybrid file system path, and move a taskbar button corresponding to the generated application output window to the generated taskbar button group, the taskbar button generated by the operating system responsive to generation of the application output window.

14. The system of claim 10, wherein the local client is further configured to:

store the received user interface element with an identification corresponding to the generated application output window; and the operating system is further configured to display, responsive to user interaction with a taskbar button generated by the operating system responsive to generation of the application output window, the received user interface element.

15. The system of claim 14, wherein the received user interface element comprises a thumbnail image of the application output.

16. The system of claim 14, wherein the received user interface element comprises a window title generated by or icon of the remote application.

17. The system of claim 10, wherein the operating system is configured to:

generate a taskbar button responsive to generation of the application output window, generate a thumbnail image of the application output window, and display, responsive to user interaction with the taskbar button, the thumbnail image.

18. The system of claim 10, wherein the local client is further configured to:

generate a window title or icon of the application output window; and the operating system is configured to:

generate a taskbar button responsive to generation of the application output window, and display, responsive to user interaction with the taskbar button, the window title or icon of the remote application.

* * * * *